United States Patent [19]

Soga et al.

[11] Patent Number: 4,821,127
[45] Date of Patent: Apr. 11, 1989

[54] DEMAGNETIZING APPARATUS FOR ERASING SIGNALS RECORDED ON CONCENTRIC TRACKS

[75] Inventors: Takashi Soga; Hitoshi Hirobe, both of Tokyo, Japan

[73] Assignee: Fuji Photo Film Co., Ltd., Japan

[21] Appl. No.: 922,049

[22] Filed: Oct. 20, 1986

[30] Foreign Application Priority Data

| Oct. 18, 1985 | [JP] | Japan | 60-231005 |
| Dec. 20, 1985 | [JP] | Japan | 60-285699 |
| Jan. 14, 1986 | [JP] | Japan | 61-4166 |
| Feb. 7, 1986 | [JP] | Japan | 61-24047 |

[51] Int. Cl.$^4$ ............................ G11B 5/24; G11B 5/02
[52] U.S. Cl. ....................................... 360/66; 360/46; 360/67; 360/61
[58] Field of Search ................... 360/66, 46, 67, 61

[56] References Cited

U.S. PATENT DOCUMENTS

| 3,649,752 | 3/1972 | Kinjo | 360/66 |
| 3,723,668 | 3/1973 | Ritchey, Jr. | 360/66 |
| 4,670,799 | 6/1987 | Ogura et al. | 360/66 |
| 4,714,969 | 12/1987 | Bischoff et al. | 360/66 |

FOREIGN PATENT DOCUMENTS 0559274 5/1977 U.S.S.R. .................... 360/66

Primary Examiner—Alan Faber
Assistant Examiner—Surinder Sachar
Attorney, Agent, or Firm—Abelman Frayne Rezac & Schwab

[57] ABSTRACT

A demagnitizing apparatus erases, track by track, wideband and high-frequency recorded signals such as signals which are frequency-modulated (FM) with video signals, and thus eliminates the need for a relay to switch a single magnetic head between erasing capability and recording or reproducing capability.

4 Claims, 27 Drawing Sheets

FIG. 4
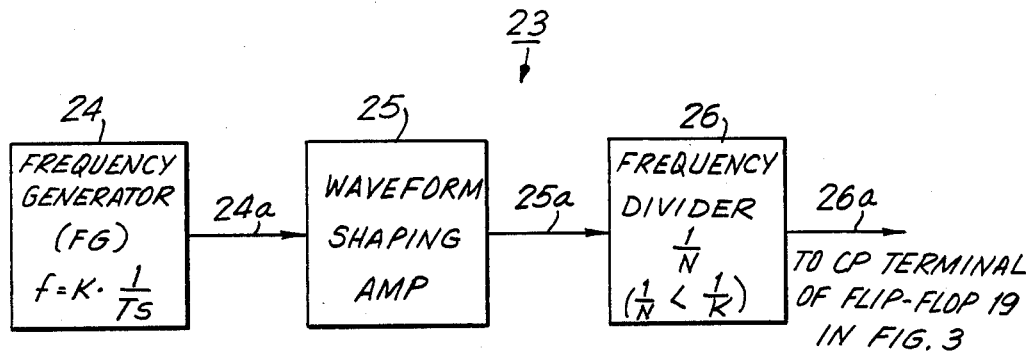
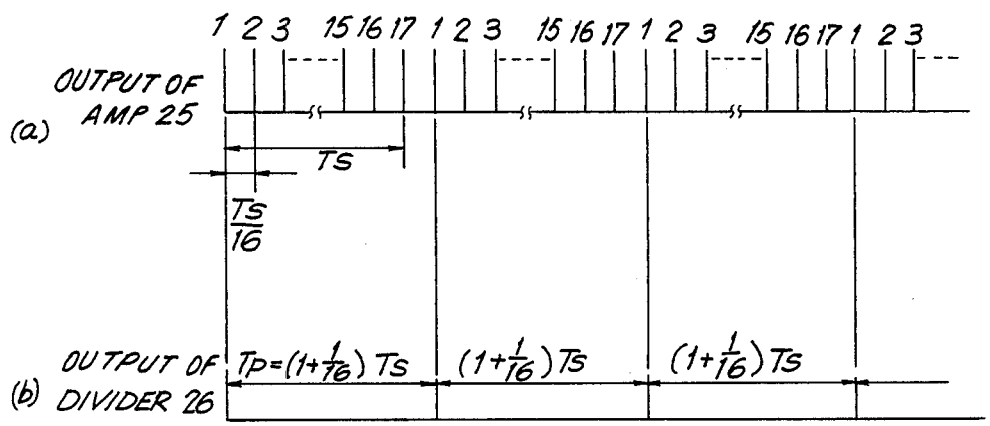
FIG. 5

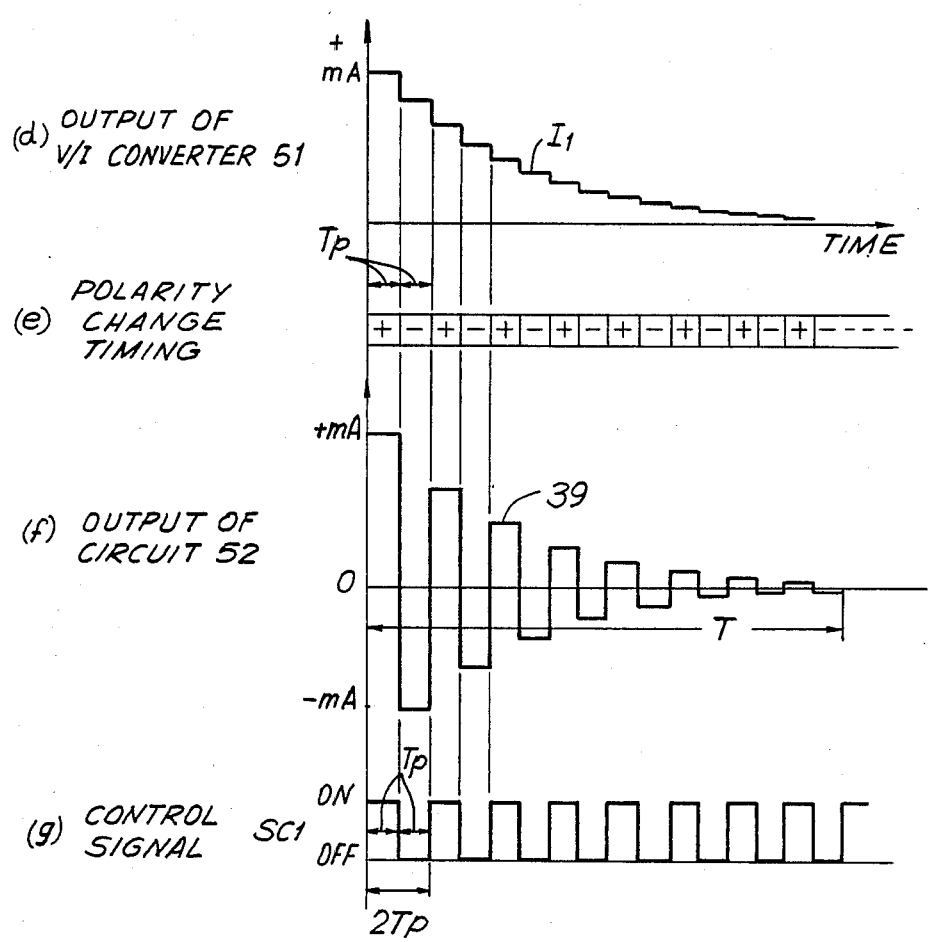
FIG. 22 (2)

DEMAGNETIZING APPARATUS FOR ERASING SIGNALS RECORDED ON CONCENTRIC TRACKS

BACKGROUND OF THE INVENTION

1. Field of the Invention

This invention relates to a demagnetizing apparatus. In particular, this invention relates to a technology for erasing, using a recording or reproducing magnetic head, information recorded on concentric tracks on a magnetic recording medium, track by track. The demagnetizing apparatus according to the present invention erases wide-band, high-frequency recorded signals such as signals which are frequency-modulated (FM) with video signals. The apparatus according to the present invention especially eliminates the need for a relay to switch a single magnetic head to recording or reproducing.

2. Description of the Related Art

An AC erasing method has been well known as a method for erasing information recorded on a magnetic recording medium such as magnetic tapes or magnetic disks. This method applies an AC magnetic field to the magnetic recording medium to be erased so that the intensity of the magnetic field gradually decreases from the saturation level to lower levels. The gradually decreasing intensity of AC magnetic field causes the hysteresis loop of magnetization in the magnetic recording medium to gradually reduce, ultimately to zero. Thus, once saturated, the magnetic field gradually reduces, while depicting loops, down to the magnetic neutral point, thereby removing residual magnetism.

The AC demagnetization is normally accomplished using a bulk eraser (hereinafter referred to as "Method 1") or an erasing magnetic head (hereinafter referred to as "Method 2"). When using the Method 1 with the bulk eraser, it is operated so that the amplitude of the AC magnetic field generated by the eraser decreases gradually. When using the Method 2 with the erasing magnetic head, on the other hand, the polarity of the magnetic field generated by the magnetic head must alternate many times while a point of the magnetic recording medium is passing over the gap of the magnetic head and an amplitude of the magnetic field applied to the point decreases gradually. For the purpose, the gap of the erasing magnetic head is designed very wide, for example, as several tens of microns.

However, the Method 1 erases all the tracks of the magnetic recording medium and, therefore, cannot be used for erasing a particular track.

On the other hand, the Method 2 can be used for erasing track by track. However, a separate erasing head is required in addition to the recording or reproducing head, which leads to an increase in cost of the magnetic recording or reproducing system, or makes it difficult to design a compact unit. Moreover, recently developed electronic still cameras or video recording systems, in which video signals are recorded on concentric tracks of a small magnetic disk with a diameter of about 47 mm, have no space to contain the erasing magnetic head. Therefore, such an erasing magnetic head is not practically applicable.

It will be convenient if a desired track can be erased as with the Method 2 using a recording or reproducing magnetic head. This can be made with no major problems in systems for recording or reproducing signals of relatively low frequencies such as an audio tape recorder. However, since systems for recording or reproducing high-frequency signals, such as a magnetic disk-type electronic still camera, have a recording or reproducing magnetic video head with a gap width on the order of 0.1 micron, it is practically impossible to use AC demagnetization in such systems. For example, in an electronic still camera system using a 47 mm diameter magnetic disk rotating at 60 revolutions per second, which records video signals on concentric tracks on the magnetic disk, one field on one track, the recording or reproducing video head has a gap width of 0.25 to 0.35 microns so that signals with high frequencies up to about 10 MHz can be recorded. To accomplish erasing as the Method 2 using a video head with such a narrow gap, the video head must generate a magnetic field with an extremely higher frequency, for example, of 50 to 100 MHz, far exceeding the upper limit of the recording or reproducing frequencies and with a sufficiently high amplitude. However, it is not easy, with currently available technologies, to manufacture a recording or reproducing video head that generates such a high frequency magnetic field and, even if manufactured, it will be extremely expensive. Moreover, even if the high frequency magnetic field is generated, because of its high frequency, the field can reach only a very thin surface layer of the magnetic recording medium. As a result, from among the recorded video signals, low-frequency components of about 1 MHz in frequency recorded down to deep layers of the magnetic recording medium remain unerased. For the above described reasons, the AC demagnetization using a recording or reproducing video head has not been practically used.

There is another method for erasing track by track using a recording or reproducing magnetic head, in which a single-frequency signal with a relatively high frequency within the recording or reproducing frequency range is recorded overwritingly on a track to be erased. This method erases previously recorded signals in some measure. However, since the overwritten signal remains on the track, this method cannot provide a substantial erasing. Furthermore, this method is defective in that, when the previously recorded signals have a wide frequency range, such as video signals, a substantial level of low-frequency components remains unerased.

As described above, there have been various defects and limitations in the methods for erasing information on tracks by applying a high-frequency magnetic field using a recording or reproducing magnetic head. For a system in which a single magnetic head can repeatedly scan the same track, such as recording systems using magnetic disks, it has been known that easing is effectively made by applying DC current pulses, such as disclosed in Japanese Patent Publication No. 19378/1972 and No. 1409/1976, and Japanese Patent Application Laying-open No. 66414/1973. These disclosed methods use a plurality of square current pulses with alternating polarities and gradually decreasing levels. The polarity of the square current pulses changes at every turn of the magnetic disk. These erasing methods are expected to provide the same erasing effect as with the AC demagnetization, described in the method with the bulk eraser, while the magnetic disk is rotating at a normal speed, with no residual low-frequency components of previously recorded signals.

However, in an erasing method using DC current pulses, since in principle it is necessary to apply a DC current with alternating polarities to the magnetic head coil, an erasing signal circuit and a recording or reproducing signal circuit cannnot be switched at an input-/output terminal for recording or reproducing signals, for example, the secondary side (amplifier side) of a step-up transformer, as in the AC demagnetization, but must be switched at the primary side of the step-up transformer where weak signals are involved. Use of a relay circuit for switching the erasing signal circuit and the recording or reproducing signal circuit leads to a complex circuit package which makes it difficult to design a compact unit. For the reasons, this method has not been used in a reliable, practical erasing system having a switching circuit for erasing and recording or reproduction.

SUMMARY OF THE INVENTION

With a view to obviate all of the prior art defects of erasing methods, it is an object of the present invention to provide a demagnetizing apparatus for erasing, track by track, information recorded on concentric recording tracks, using a recording or reproducing magnetic head, in which, a magnetic field is converged from a saturation level to a magnetic neutral point, while depicting loops, thereby providing erasing with no residual magnetism.

Another object of the present invention is to provide an initial value and a decaying period of erasing current for obtaining the same erasing effect as with a bulk eraser.

The other object of the present invention is to provide an apparatus which is suitable for use by switching a magnetic head for recording or reproduction purpose or erasing purpose.

In accordance with the present invention which attains the above objects, there is provided a first demagnetizing apparatus according to the present invention comprising a recording or reproducing magnetic head for scanning concentric tracks on a magnetic recording medium, a transformer having a first coil connected to a recording or reproducing amplifier and a second coil insulated regarding DC potentials from the first coil, a series circuit consisting of a coil of the recording or reproducing magnetic head and the second coil of the transformer connected in series, two current-controllable, constant-current DC power supplies having the same polarity, with output terminals connected to both ends of the series circuit, two semiconductor switches respectively connected between the both ends of the series circuit and return paths of the DC power supplies, a switching control circuit for keeping ON the semiconductor switches during recording or reproduction operation of the apparatus, or alternately switching ON and OFF the semiconductor switches with a period of the same as or longer than that for scanning one turn of a track during erasing operation of the apparatus, and a current control circuit for changing current values of the DC power supplies so that current values of the DC power supplies are kept at zero during recording or reproduction operation of the apparatus, or that the intensity of magnetic field of the magnetic head applied to a point on the track decreases at every switching operation of the semiconductor switches during erasing operation of the apparatus.

There is also provided a second demagnetizing apparatus according to the present invention comprising a plurality of recording or reproducing magnetic heads for separately scanning concentric tracks on a magnetic recording medium, a plurality of transformers having first coils connected to a recording or reproducing amplifier and second coils insulated regarding DC potentials from the first coils, a plurality of unit circuits, each consisting of each coil of the magnetic heads and each second coil of the transformers connected in series, a series circuit consisting of the plurality of unit circuits connected in series, two current-controllable, constant-current DC power supplies having the same polarity, with output terminals connected to both ends of the series circuit, a plurality of semiconductor switches connected to both ends of the series circuit and between a connection of the unit circuits and return paths of the DC power supplies, a switching control circuit for keeping ON the plurality of semiconductor switches during recording or reproduction operation of the apparatus, or alternately switching ON and OFF the two semiconductor switches connected to both ends of the series circuit with a period of the same as or longer than that for scanning one turn of a track and keeping OFF the other semiconductor switch during erasing operation of the apparatus, and a current control circuit for changing current values of the DC power supplies so that current values of the DC power supplies are kept at zero during recording or reproduction operation of the apparatus, or that the intensity of magnetic field of the magnetic head applied to a point on the track decreases at every switching operation of the semiconductor switches during erasing operation of the apparatus.

There is further provided a third demagnetizing apparatus according to the present invention comprising a plurality of recording or reproducing magnetic heads for separately scanning concentric tracks on a magnetic recording medium, a plurality of transformers having first coils connected to a recording or reproducing amplifier and second coils insulated regarding DC potentials from the first coils, a plurality of unit circuits, each consisting of each coil of the magnetic heads and each second coil of the transformers connected in series, a series circuit consisting of the plurality of unit circuits connected in series, a plurality of current-controllable, constant-current DC power supplies having the same polarity, with output terminals connected to both ends of the series circuit and any of connections between the unit circuits, a plurality of semiconductor switches connected to both ends of the series circuit and between a connection of the unit circuits and return paths of the DC power supplies, a switching control circuit for keeping ON all of the plurality of semiconductor switches during recording or reproduction operation of the apparatus, or in a first erasing mode, alternately switching ON and OFF the two semiconductor switches connected to both ends of the series circuit with a period of the same as or longer than that for scanning one turn of a track and keeping OFF the other semiconductor switch, or in a second erasing mode, alternately switching ON and OFF the semiconductor switch connected to the connection between the unit circuits connected with an output terminal of the DC power supply and another one of the semiconductor switches connected to another one of the DC power supplies with a period of the same as or longer than that for scanning one turn of a track and keeping OFF the other semiconductor switch, and a current control circuit for keeping current values of all the DC power supplies at zero during recording or reproduction operation of the apparatus, or varying current values of the two DC power supplies with output terminals connected to the two semiconductor switches to be ON/-

OFF controlled so that the intensity of magnetic field of the magnetic head applied to a point on the track to be erased decreases at every switching operation of the semiconductor switches and keeping current values of the other DC power supplies at zero during erasing operation of the apparatus.

There is further provided a fourth demagnetizing apparatus according to the present invention comprising a decreasing voltage generator circuit for generating a gradually decreasing DC voltage during erasing operation of the apparatus and keeping generated voltage to zero during recording or reproducing operation of the apparatus, a voltage/current converter circuit for generating a gradually decreasing DC current by converting output voltage of the decreasing voltage generator circuit to current, a reference transistor connected in a diode configuration for flowing the gradually decreasing DC current, a first transistor with the base connected to the base of the reference transistor to form a first current mirror circuit together with the reference transistor, a second transistor with the base connected to the base of the reference transistor to form a second current mirror circuit together with the reference transistor, a switching circuit having a first switching transistor disposed between an output of the first transistor and ground and a second switching transistor disposed between an output of the second transistor and ground, a series circuit consisting of a coil of a recording/reproducing/erasing magnetic head for scanning concentric tracks on a magnetic recording medium and a primary coil of a transformer, connected in series between output terminals of the first and second transistors, a secondary coil of the transformer being connected to a recording/reproducing amplifier, and a switching control circuit for keeping ON the first and second switching transistors during recording or reproduction operation of the apparatus, or alternately switching ON and OFF the first and second switching transistors with a period of the same as or longer than that for scanning one turn of a track during erasing operation of the apparatus.

BRIEF DESCRIPTION OF THE DRAWINGS

FIG. 4 is a block diagram showing a pulse generator circuit for Tp>Ts. FIG. 5, (a) and (b), is a timing chart of the operation of the pulse generator circuit shown in FIG. 4.

DESCRIPTION OF THE PREFERRED EMBODIMENTS

Description of the principle

Figure 6:
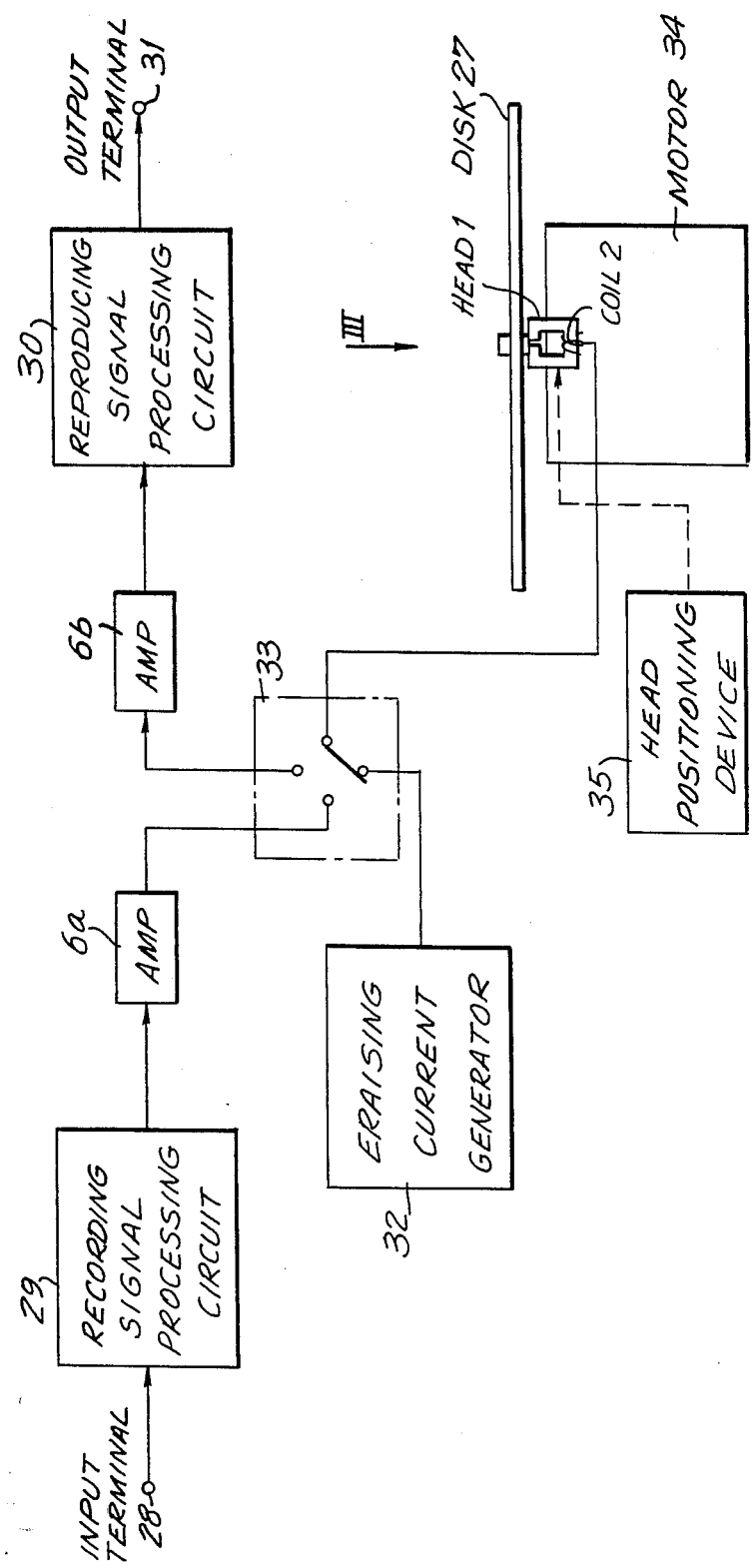
FIG. 6 is a side view showing the relation between a magnetic disk and a magnetic head.
Figure 7:
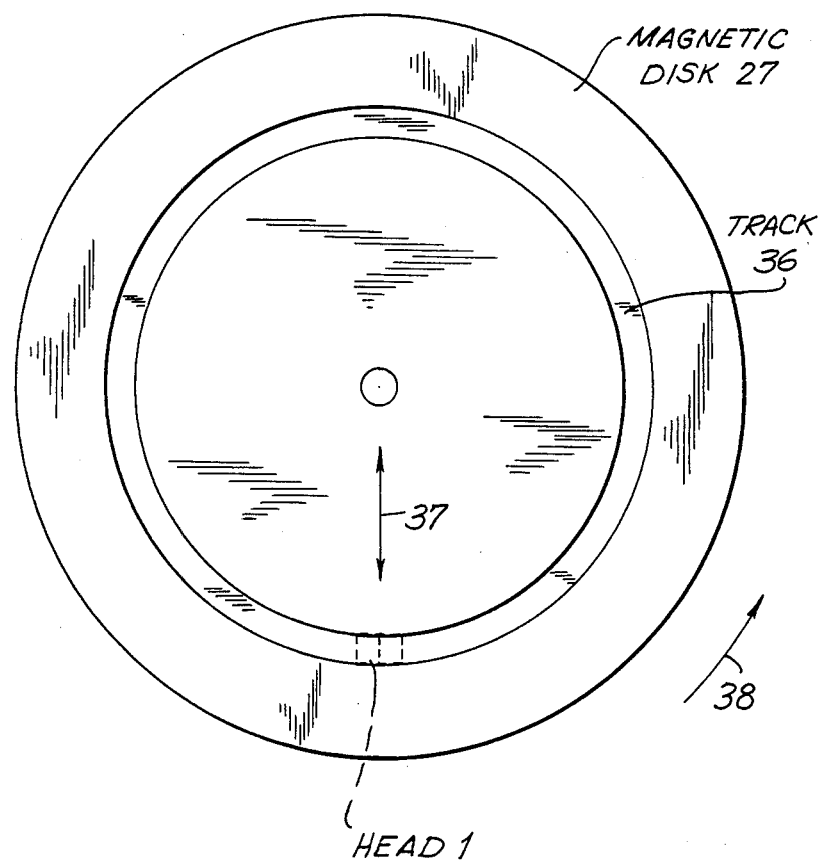
FIG. 7 is an enlarged view of FIG. 6.
Figure 8:
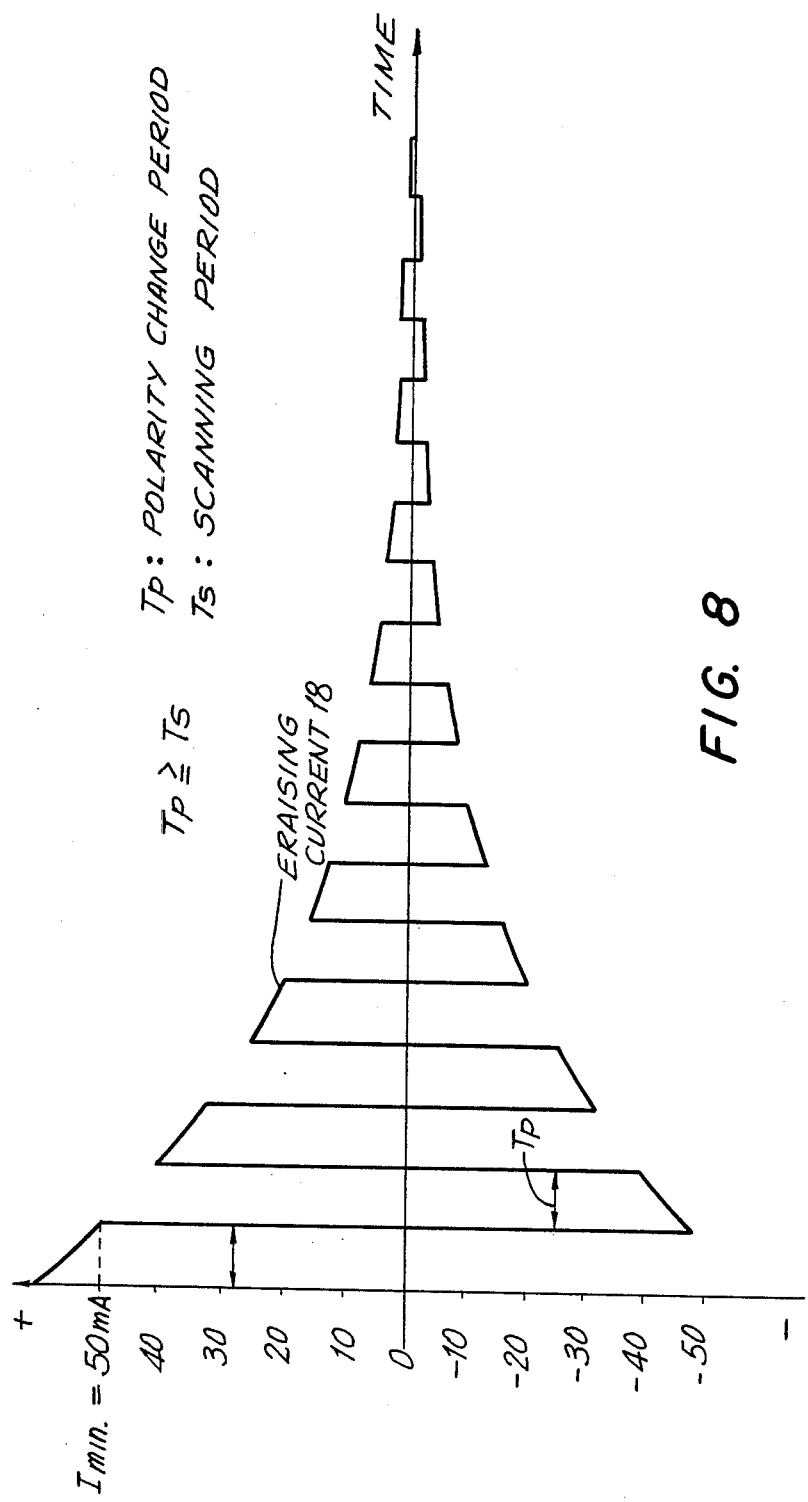
FIG. 8 is a chart showing a waveform of erasing current.

Suppose that an erasing current 18 having a waveform as shown in FIG. 8 flows through a coil 2 of a recording or reproducing magnetic head 1 of a video recording system using a magnetic disk 27 as shown in FIG. 6. In FIG. 6, numeral 28 indicates a video signal input terminal, numeral 29 indicates a recording signal processing circuit including frequency modulation, numeral 6a indicates a recording amplifier, numeral 6b indicates a reproducing amplifier, numeral 30 indicates a reproducing signal processing circuit including frequency demodulation, numeral 31 indicates a video signal output terminal, numeral 32 indicates a generator circuit for generating the erasing current 18, numeral 33 indicates a switch, numeral 34 indicates a motor for rotating the magnetic disk at a speed of 60 revolutions per second, and numeral 35 indicates a head positioning device. FIG. 7 is an up-view of the magnetic disk viewed in direction III in FIG. 6. In FIG. 7, numeral 36 indicates a concentric track, numeral 37 indicates a head moving direction, and numeral 38 indicates a rotating direction of the disk.

The erasing current shown in FIG. 8 alternates its polarity with a period of Tp, and its amplitude decreases exponentially. In this case, $Tp \geq Ts$, where Ts is a period for scanning one turn of the track 36 by the magnetic head 1, for example Ts=1/60 second.

Figure 9:
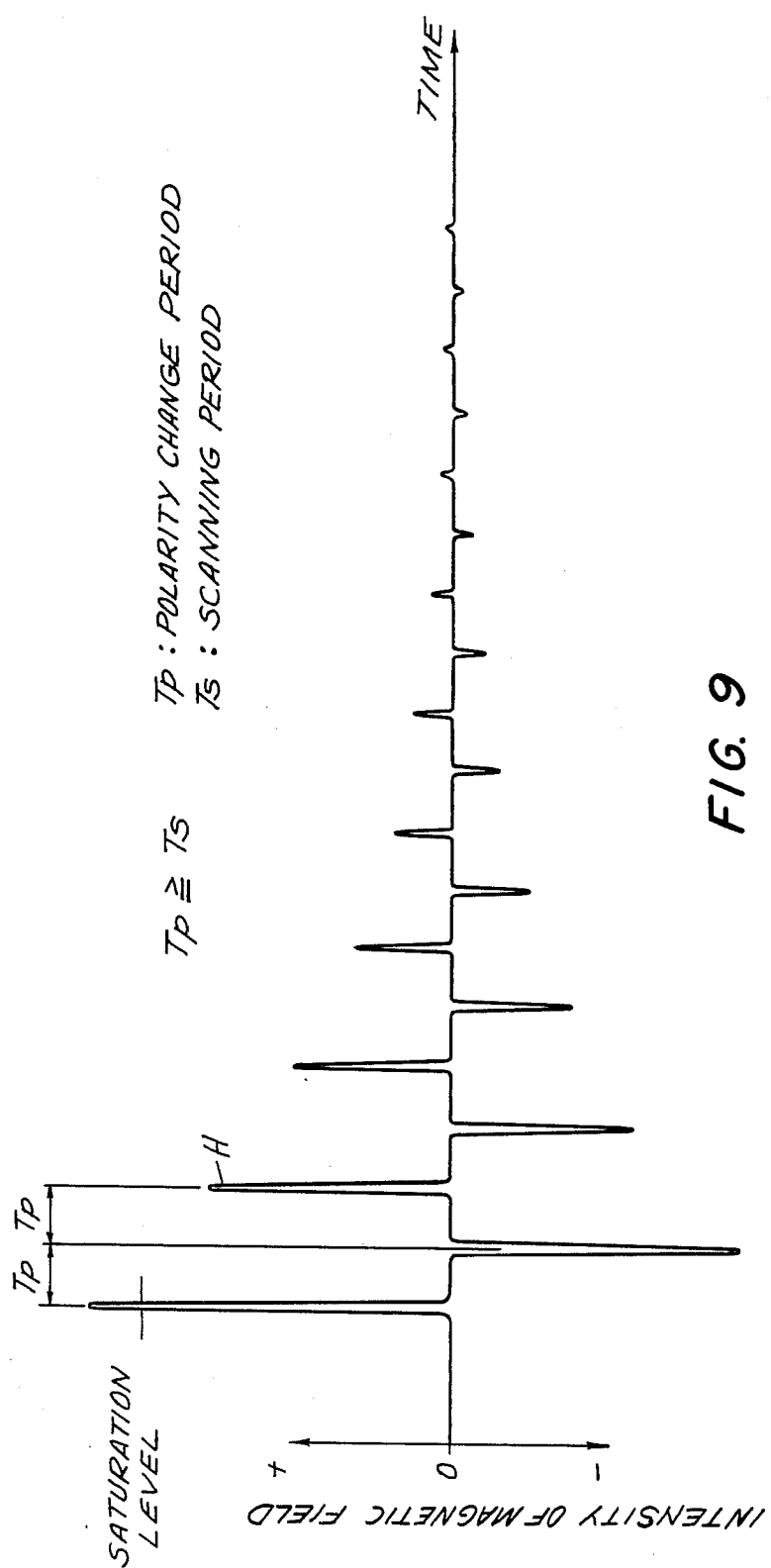
FIG. 9 is a schematic showing principle of erasing.
Figure 11:
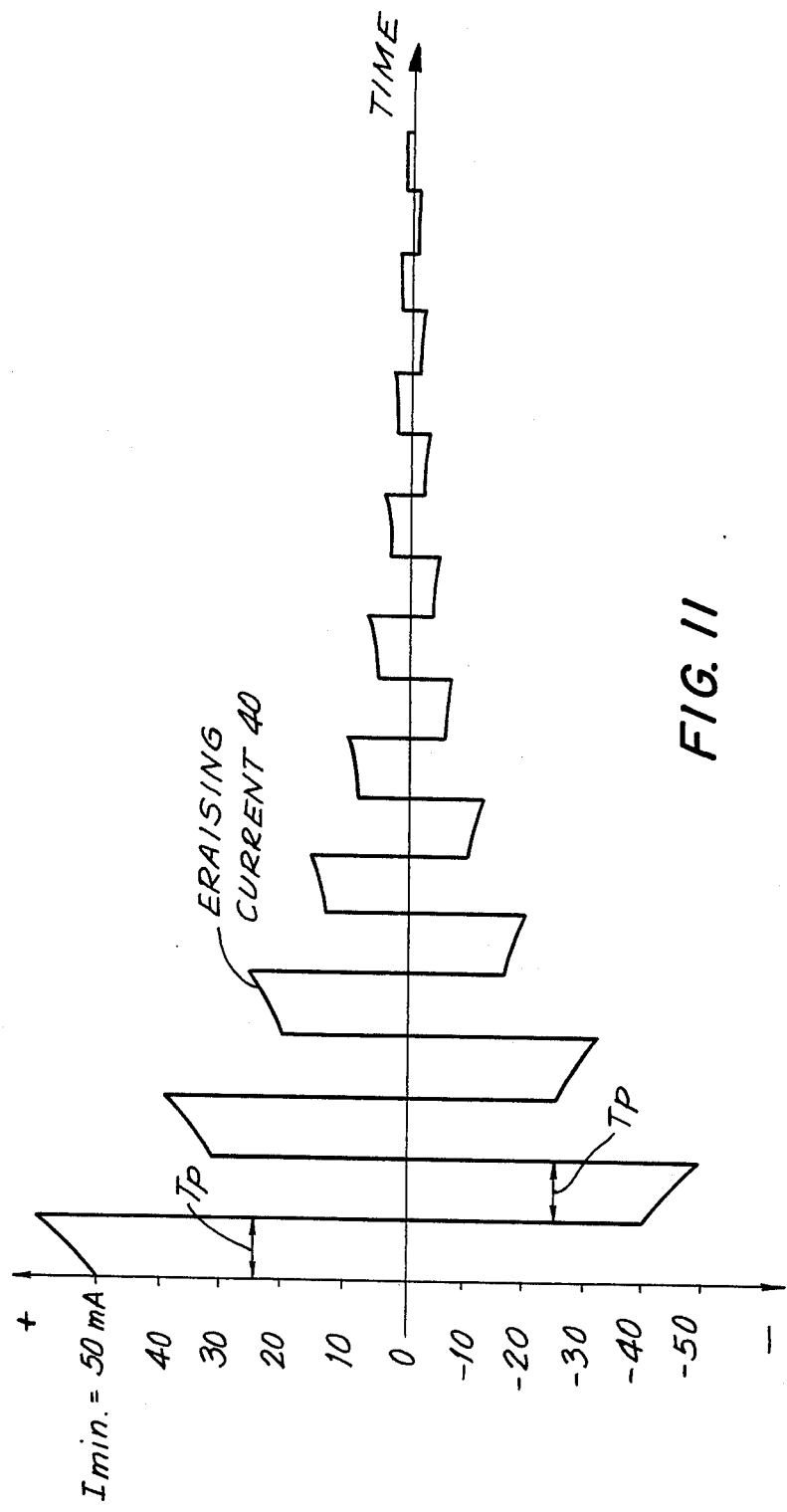
Figure 12:
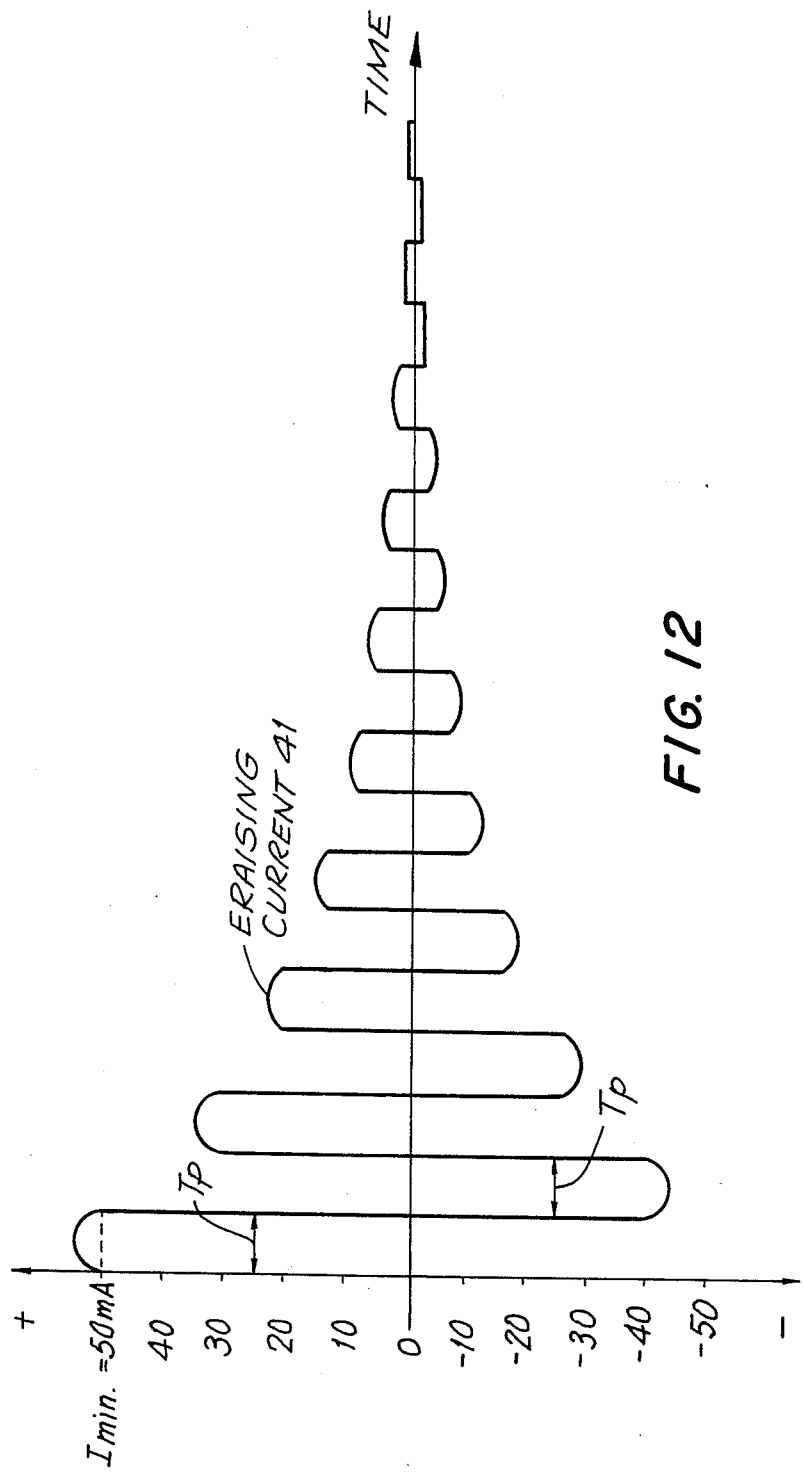

When the erasing current 18 flows through the coil 2 of the magnetic head 1, since $Tp \geq Ts$, every point on the track 36 is subjected to a magnetic field along the lengthwise direction of the track, with polarities alternating at every period of Tp and gradually decreasing amplitudes, as shown in FIG. 9. In this case, a minimum value Imin of the erasing current 18 in the first period is assumed to have a value that may magnetize the magnetic disk 27 to the saturation level. This causes the magnetic field to once saturate and then converge to the magnetic neutral point while depicting loops, thereby removing magnetism on the track 36. It is preferable that the amplitude of the erasing current decays as gradually as possible in the area near zero. The erasing current may have any of the waveforms that can generate a magnetic field as shown in FIG. 9 at any point on the track, such as indicated with numerals 39, 40, and 41 in FIGS. 10, 11, and 12.

First embodiment

Preferred embodiments of the present invention will now be described in detail with reference to the drawings.

Figure 1:
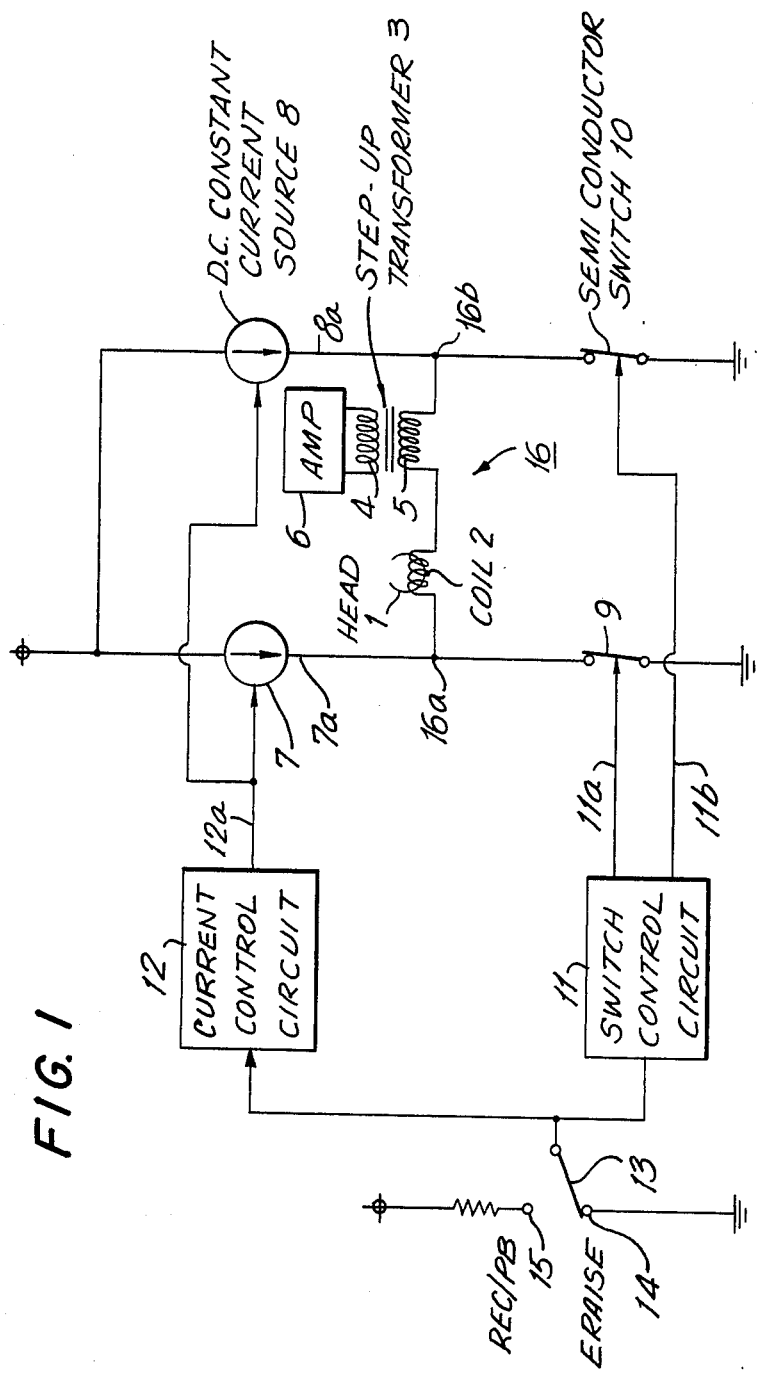
FIG. 1 is a block diagram of an embodiment of the first demagnetizing apparatus according to the present invention.

Referring to FIG. 1 showing a first embodiment of the present invention, numeral 1 indicates a recording or reproducing magnetic head, numeral 2 indicates a coil of the magnetic head 1, numeral 3 indicates a step-up transformer, numeral 4 indicates a first coil of the step-up transformer, numeral 5 indicates a second coil insulated regarding DC potentials from the first coil, numeral 6 indicates a recording or reproducing amplifier, numeral 7 and 8 indicate current-controllable, constant-current DC power supplies having the same polarity, numerals 9 and 10 indicate semiconductor switches, numeral 11 indicates a switching control circuit, numeral 12 indicates a current control circuit, numeral 13 indicates an instruction switch, numerals 11a and 11b indicate switching control signals, and numeral 12a indicates a current control signal.

The coil 2 of the magnetic head 1 and the second coil 5 of the transformer 3 are connected to form a series circuit 16, and both ends 16a and 16b of the series circuit 16 are connected to output terminals 7a and 8a of the DC power supplies 7 and 8. The both ends 16a and 16b of the series circuit 16 are also grounded through the semiconductor switches 9 and 10.

Figure 10:
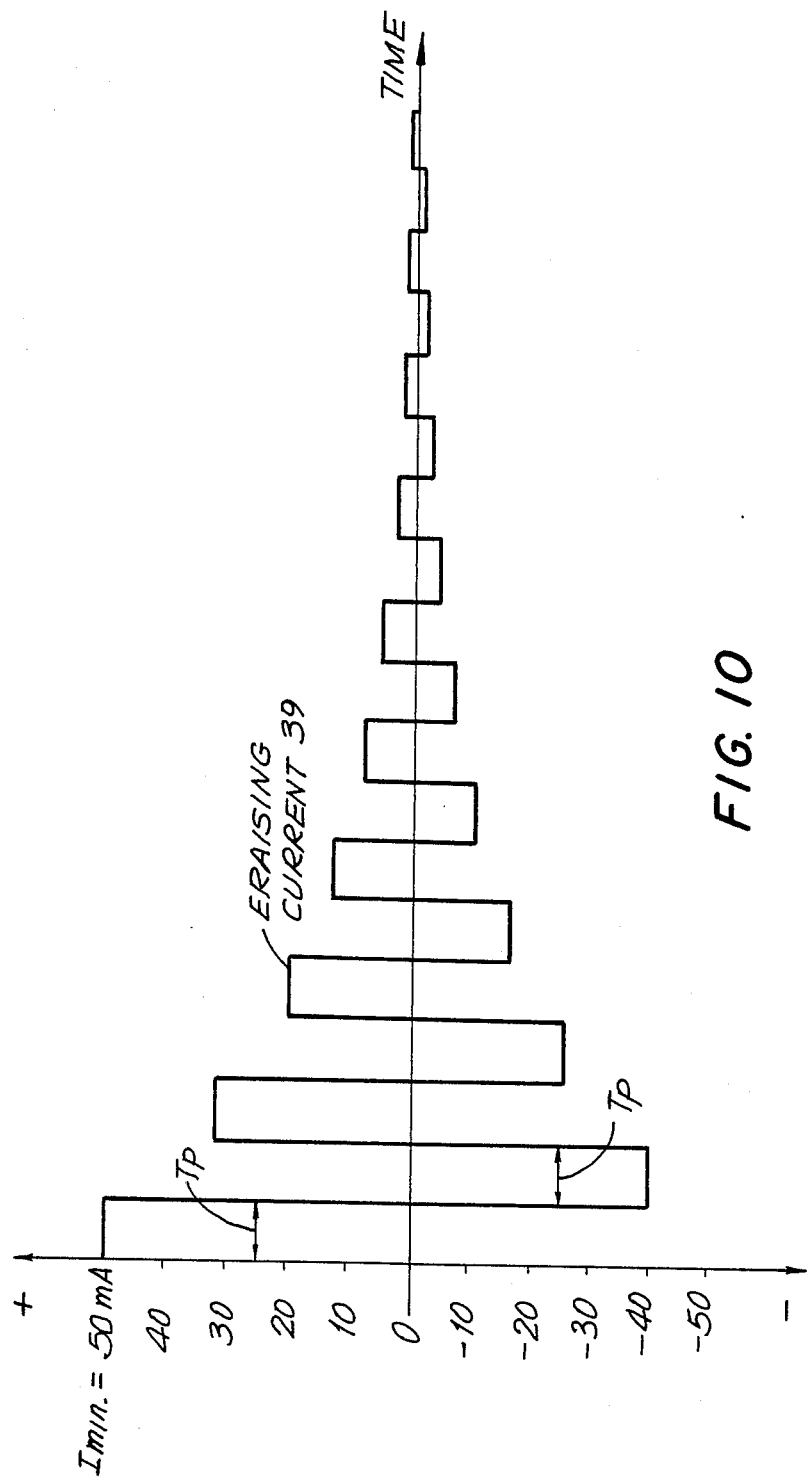
FIGS. 10 through 12 are charts showing other waveforms of erasing current.

The transformer 3 isolates the recording or reproducing amplifier 6 regarding DC potentials from the magnetic head 1. An erasing current having a waveform as shown in FIG. 8 or FIG. 10 is flown through the magnetic head by alternately turning ON and OFF the semiconductor switches 9 and 10 so that every point on the track is applied with a magnetic field H with polarities alternating at every period of Tp and gradually decreasing amplitudes, as shown in FIG. 9. Tp is determined by the switching control circuit 11, and the amplitude of the erasing current is controlled by the current control circuit 12. In this case, although loads of the DC power supplies vary with the ON/OFF operation of the semiconductor switches, the output currents of the DC power supplies 7 and 8 are kept at constant values determined by the current control circuit 12 regardless of changes in load since the DC power supplies 7 and 8 are constant-current sources.

When both the semiconductor switches are turned ON, a closed loop is formed by the circuit 16 consisting of the coil 2 of the magnetic head 1 and the second coil 2 of the transformer 3 through the two semiconductor switches 7 and 8, which allows a recording current to flow in the coil 2 of the magnetic head 1 through the transformer 3, or a reproducing signal generated in the coil 2 of the magnetic head 1 to be taken out of the transformer 3. During the recording or reproducing operation of the apparatus, DC noises contained in the recording current or reproducing signals can be minimized by setting the current values of all the DC power supplies 7 and 8 to zero.

Figure 2:
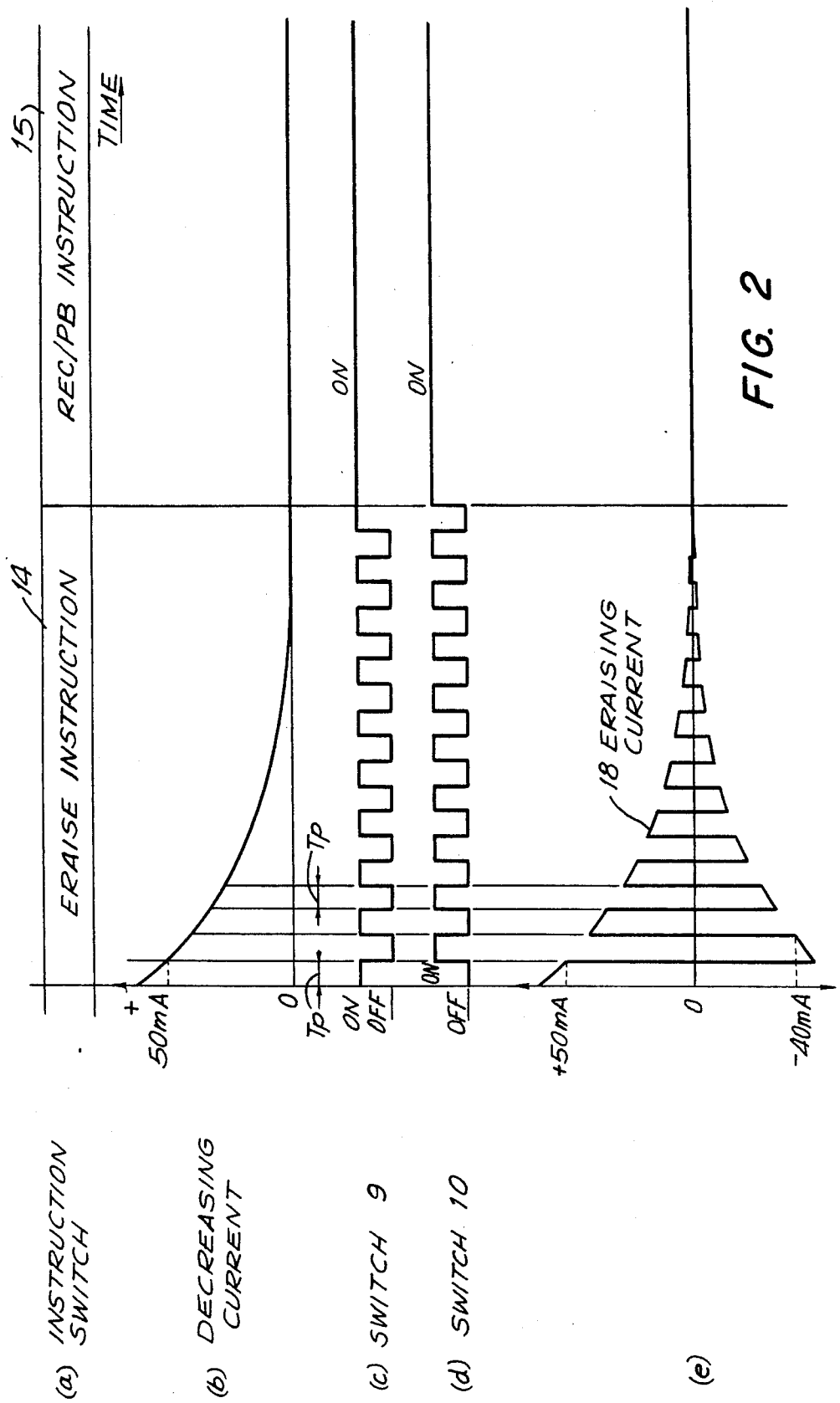
FIG. 2, (a) through (e), is a chart showing the operation of the apparatus shown in FIG. 1.

The operation of the demagnetizing apparatus shown in FIG. 1 will be described with reference to FIGS. 2(a) through 2(e). When an erasing instruction 14 is applied as shown in FIG. 2(a) by operating the instruction switch 13, a gradually decreasing current 17 shown in FIG. 2(b) decaying from a predetermined value to zero, controlled by the current control circuit 12, is outputted from the two DC power supplies 7 and 8 and, at the same time, the two semiconductor switches 9 and 10, controlled by the switching control circuit 11, are alternately turned ON and OFF at every period of Tp, as shown in FIG. 2(c). Where Tp≧Ts, and Ts is a scanning period for one turn of the track. This flows the same erasing current 18 as shown in FIG. 8 through the coil 2 of the magnetic head 1, as shown in FIG. 2(e). The erasing current may be converged to zero within 10 to 100 cycles of polarity alternation.

Further, after erasing, with the output currents of the DC power supplies 7 and 8 decayed to zero as shown in FIG. 2(b), when a recording or reproducing instruction 15 is outputted by operating the instruction switch 13, the two semiconductor switches 9 and 10 are turned ON by the control of the switching control circuit 11 as shown in FIGS. 2(c) and 2(d). This shuts off the erasing current, and the system is ready for recording or reproduction.

To obtain an erasing current 39 shown in FIG. 10, the output currents of the two DC power supplies can be controlled by the current control circuit 12 so that they decay stepwise at every switching operation of the semiconductor switches 9 and 10.

Second embodiment

Figure 3:
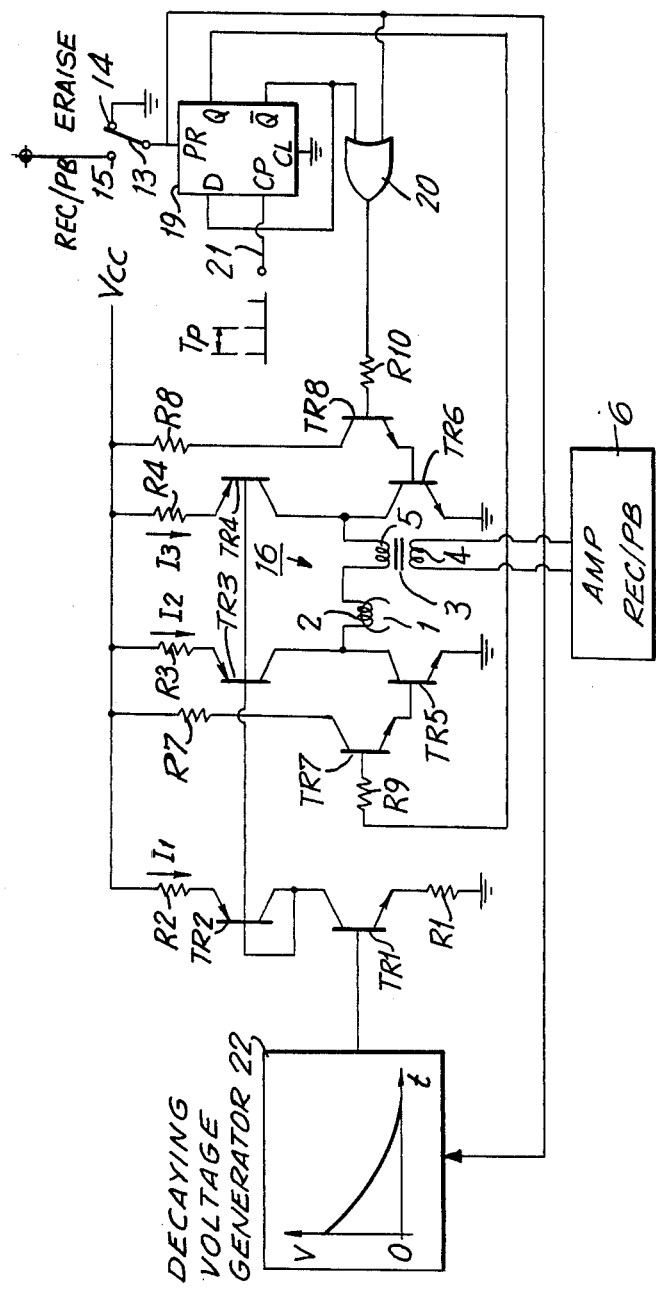
FIG. 3 is a circuit diagram showing the configuration of the apparatus shown in FIG. 1.

A further detailed circuit example corresponding to the first embodiment of the demagnetizing apparatus according to the present invention will now be described with reference to FIGS. 3 through 5. In the embodiment shown in FIG. 3, DC power supplies consist of current mirror circuits. Referring to FIG. 3, the emitter of an NPN transistor TR1 is grounded through a resistor R1, and the collector of the transistor TR1 is connected to the base and collector of a PNP transistor TR2 of which the emitter is connected to the positive terminal (Vcc) through a resistor R2. The base of the transistor TR2 is connected with the bases of two PNP transistors TR3 and TR4, of which the emitters are connected to the positive terminal Vcc through resistors R3 and R4, respectively. The collectors of these transistors TR3 and TR4 are connected across the series circuit 16 consisting of the coil 2 of the magnetic head 1 and the second coil 5 of the transformer 3, and further to the collectors of two NPN switching transistors TR5 and TR6. The emitters of the switching transistors TR5 and TR6 are directly grounded. The bases of the switching transistors TR5 and TR6 are connected to the emitters of NPN driving transistors TR7 and TR8, respectively. The collectors of the transistors TR7 and TR8 are connected to the positive terminal Vcc through resistors R7 and R8, respectively. The base of the transistor TR7 is connected to a terminal Q of a flip-flop 19 through a resistor R9, and the base of the transistor TR8 is connected to an output terminal of an OR gate 20 through a resistor R10. A terminal PR of the flip-flop 19 is selectively connected to a low potential or a high potential through the instruction switch 13, and a terminal CL is grounded. A terminal CP of the flip-flop 19 is inputted with pulses 21 generated during the scanning period Ts for one turn of the track, such as a PG pulse and a VD pulse. Terminals $\overline{Q}$ and D are short-circuited. Two input terminals of the OR gate 20 are respectively connected to terminals $\overline{Q}$ and PR of the flip-flop 19.

The operation of the circuit shown in FIG. 3 will now be described. When a decaying voltage having a predetermined waveform from a decaying voltage generator circuit 22 is applied to the base of the transistor TR1, the decaying voltage is converted to a decaying current having a waveform similar to that of the decaying voltage, and decaying currents I1, I2, and I3 having the same waveform flow through the three transistors TR2 to TR4 by a current mirror effect. The decaying currents I1, I2, and I3 are kept at values of I1=I2=I3 by the negative feedback effects of the emitter resistors R2, R3, and R4 of the transistors TR2, TR3, and TR4. These decaying currents I1, I2, and I3 are constant currents determined by the decaying voltage applied to the base of the transistor TR1. When the instruction switch 13 is turned to an erasing side 14 to set the terminal PR of the flip-flop 19 to the low potential, the input pulses 21 at the terminal CP are frequency-divided, and the switching transistors TR5 and TR6 repeat ON and OFF alternately every time the pulses 21 are inputted, that is, at a period of Tp (where Tp=Ts). This flows the erasing current 18 shown in FIG. 2(e). On the other hand, when the instruction switch is turned to a recording or reproducing side 15 to set the terminal PR to the high potential, both the terminal Q and the output terminal of the OR gate 20 are at the high potential, which turns ON the switching transistors TR5 and TR6. At this time, the decaying currents I1, I2, and I3 are set to zero, and the system is ready for recording or reproduction.

In the circuit example shown in FIG. 3, the terminal CP of the flip-flop 19 is inputted with the pulses 21 generated at every scanning period Ts for one turn of the track to reverse the polarity of the erasing current 18 at every period Tp, where Tp=Ts.

To obtain a relation Tp>Ts, a pulse can be applied to the terminal CP of the flip-flop 19 at every period Tp, where Tp>Ts. An example of circuit to apply such a pulse is shown in FIG. 4 and 5. Referring to FIG. 4, a pulse generator 23 has a frequency generator (FG) 24 which generates a frequency signal proportional to the rotation speed of the magnetic disk (numeral 27 in FIG. 6), a waveform shaping amplifier 25, and a 1/N frequency divider 26. As described above, since Ts is a period for the magnetic head to scan one turn of the circular track on the magnetic disk, when the frequency generator (FG) generates a signal 24a having a frequency of $f=K \times 1/Ts$ (where K>>1), the frequency divider 25 divides the input signal under the condition of 1/N<1/K to obtain a signal 25a having a period Tp which is longer than Ts. Thus, the relation can be shown as $$Tp = N/f = N/K \cdot Ts > Ts$$

For example, when using the frequency generator (FG) 24 which generates $f=16 \times 1/Ts$, a shaped pulse signal 25a is inputted from the amplifier 25 to the frequency divider 26, as shown in FIG. 5(a). By frequency dividing by N=17, a pulse signal 26a with $Tp=(1+1/16)Ts$ as shown in FIG. 5(b). When N=18, $Tp=(1+2/16)Ts$, and when N=19, $Tp=(1+3/16)Ts$. A relationship between Tp and Ts can be flexibly set by selecting the values of K and N, and the output pulse 26a of a frequency divider 26 can be inputted to the terminal CP of the flip-flop 19 shown in FIG. 3.

Third embodiment

Figure 13:
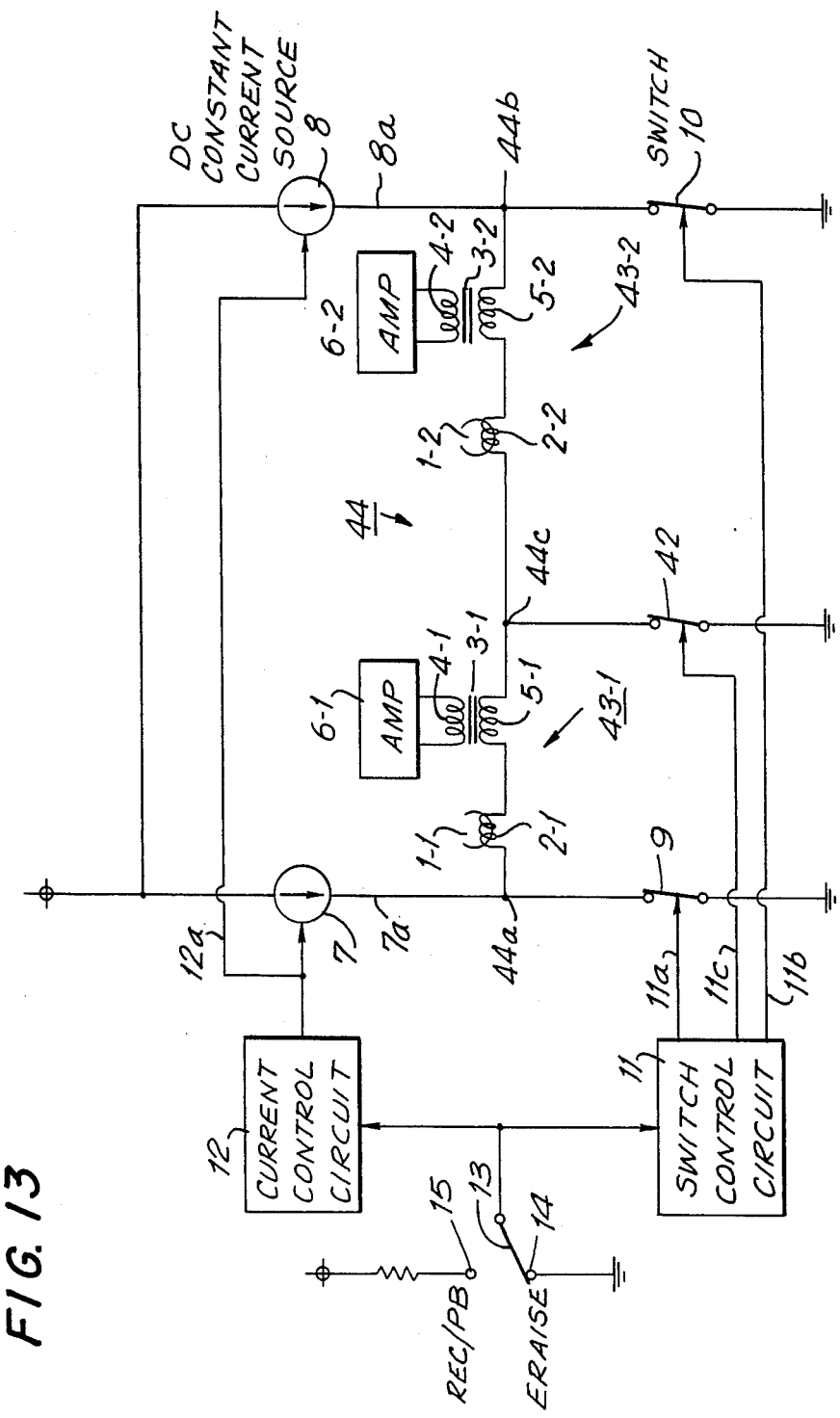
FIG. 13 is a block diagram of an embodiment of the second demagnetizing apparatus according to the present invention.

An example of the second demagnetizing apparatus according to the present invention will now be described with reference to FIG. 13 showing the apparatus using a 2-channel magnetic head. In FIG. 13, numerals 1-1 and 1-2 indicate recording or reproducing magnetic heads, numerals 2-1 and 2-2 indicate coils of the magnetic heads, numerals 3-1 and 3-2 indicate step-up transformers, numerals 4-1 and 4-2 indicates first coils of the transformers, numerals 5-1 and 5-2 indicate second coils of the transformers, numerals 6-1 and 6-2 indicate recording or reproducing amplifiers, numerals 7 and 8 indicate current-controllable, constant-current DC power supplies with the same polarity, numerals 9, 10, and 42 indicate semiconductor switches, numeral 11 indicates a switching control circuit, numeral 12 indicates a current control circuit, numeral 13 indicates an instruction switch, numerals 11a, 11b, and 11c indicate switching control signals, and numeral 12a indicates a current control signal.

Referring to FIG. 13, a coil of one magnetic head and a second coil of one transformer are connected in series to form a unit circuit, and two unit circuits 43-1 and 43-2 form a series circuit 44. Output terminals 7a and 8a of the DC power supplies 7 and 8 are connected to both ends 44a and 44b, respectively, of the series circuit 44, and both ends of the series circuit 44 are grounded through the semiconductor switches 9 and 10, respectively. Further, a connection 44c between the unit circuits is grounded through the semiconductor switch 42.

Figure 14:
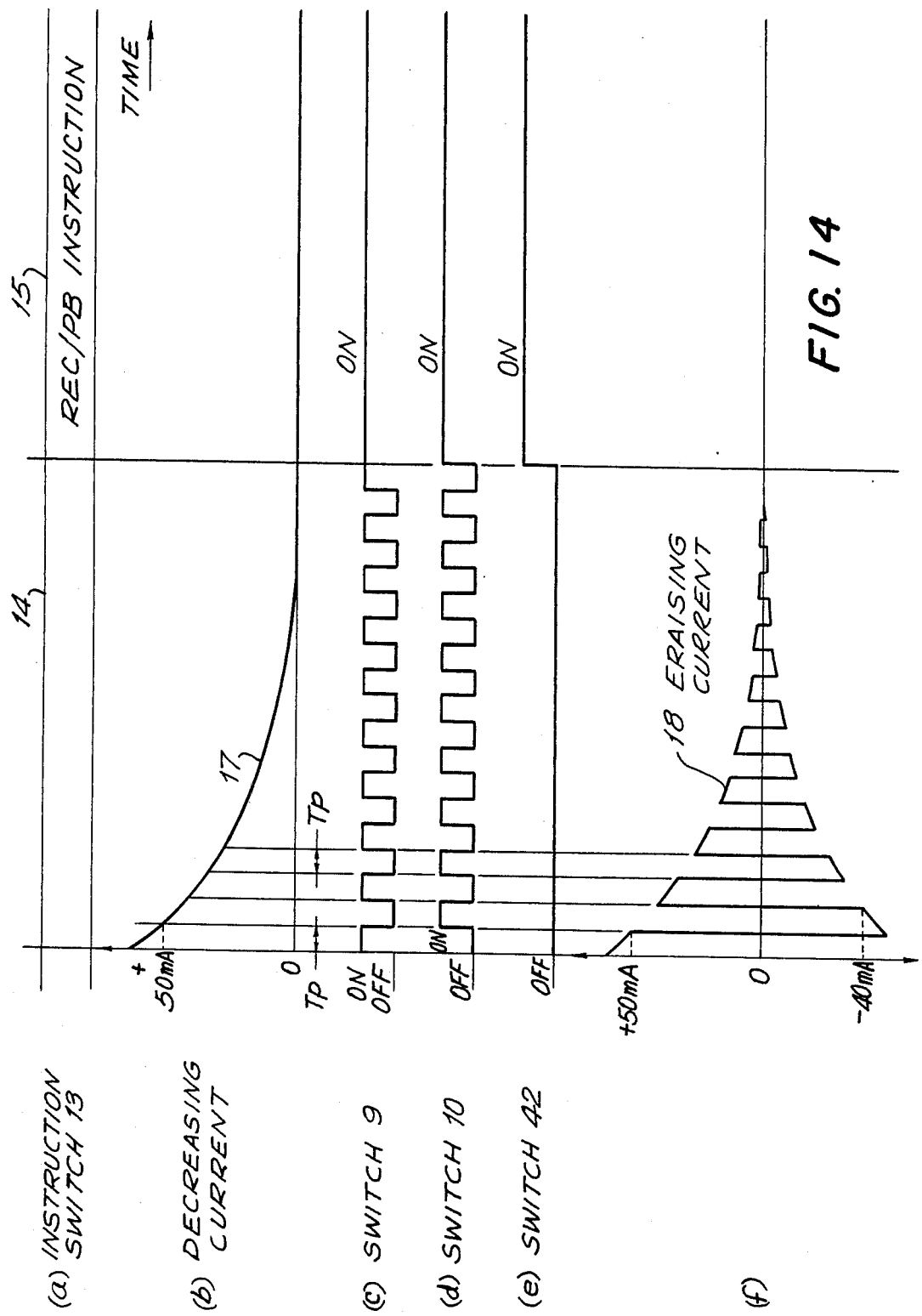
FIG. 14, (a) through (f), is a chart showing the operation of the apparatus shown in FIG. 13.

The demagnetizing apparatus shown in FIG. 13 will be described with reference to FIGS. 14(a) through 14(f). When an erasing instruction is given by operating the instruction switch 13 as shown in FIG. 14(a), a gradually decreasing current 17 which decays from a predetermined value to zero is outputted from the two DC power supplies under the control of the current control circuit 12 as shown in FIG. 14(b). At the same time, the two semiconductor switches 9 and 10 connected to both ends of the series circuit 44 are alternately turned ON and OFF at every period of Tp under the control of the switching control circuit 11 as shown in FIGS. 14(c) and 14(d), where Tp≧Ts, and Ts is a scanning period for one turn of the track. As shown in FIG. 14(e), the semiconductor switch 42 connected to the connection 44c between the unit circuits is set OFF under the control of the switching control circuit 11. This causes an erasing current 18 having the same waveform as shown in FIG. 8 to flow through the coils 2-1 and 2-2 of the two magnetic heads to simultaneously erase two tracks. The erasing current may decay to zero within 10 to 100 changes in polarity.

After erasing, when a recording or reproducing instruction 15 is given by operating the instruction switch 13 as shown in FIG. 14(a), all the semiconductor switches 9, 10, and 42 are turned ON as shown in FIGS. 14(c), 14(d), and 14(e) under the control of the switching control circuit 11, with the output currents of the DC power supplies 7 and 8 already decayed to zero. This shuts off the erasing current, and the system is ready for recording or reproduction with the magnetic heads 1-1 and 1-2

Fourth embodiment

Figure 15:
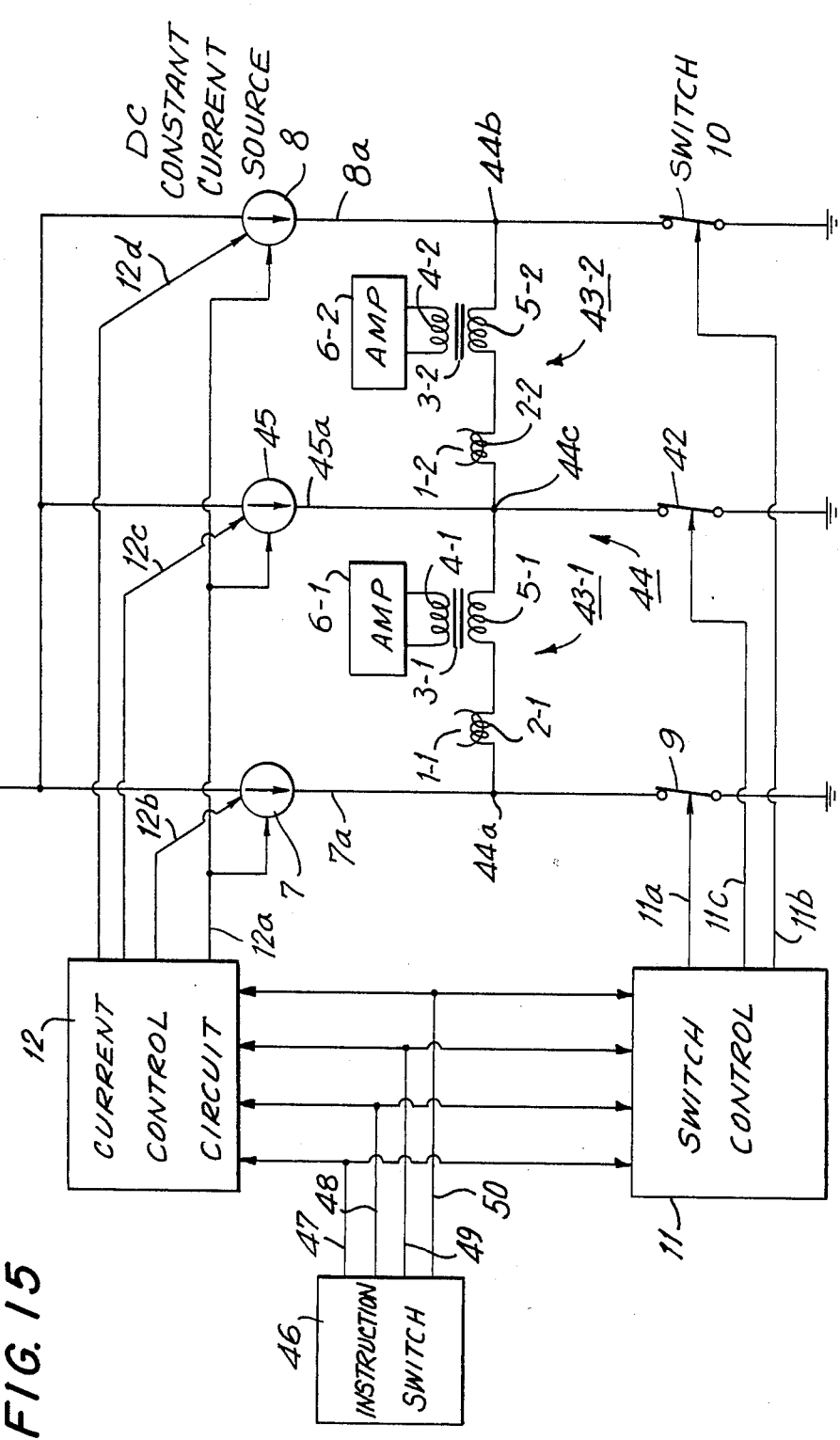
FIG. 15 is a block diagram of an embodiment of the third demagnetizing apparatus according to the present invention.

An example of the third demagnetizing apparatus according to the present invention will be described with reference to FIG. 15 showing the apparatus using a 2-channel magnetic head. In FIG. 15, numerals 1-1 and 1-2 indicate recording or reproducing magnetic heads, numerals 2-1 and 2-2 indicate coils of the magnetic heads, numerals 3-1 and 3-2 indicate step-up transformers, numerals 4-1 and 4-2 indicate first coils of the transformers, numerals 5-1 and 5-2 indicate second coils of the transformers, numerals 6-1 and 6-2 are recording or reproducing amplifiers, numerals 7, 8, and 45 indicate current-controllable, constant-current DC power supplies having the same polarity, numerals 9, 10, and 42 indicate semiconductor switches, numeral 11 indicates a switching control circuit, numeral 12 indicates a current control circuit, numeral 13 indicates an instruction switch, numerals 11a, 11b, and 11c indicate switching control signals, numeral 12a indicates a current control signal, and numerals 12b, 12c, and 12d indicate current shut-off signals.

Referring to FIG. 15, a coil of one magnetic head and a second coil of one transformer are connected in series to form a unit circuit, and two unit circuits 43-1 and 43-2 form a series circuit 44. Output terminals 7a and 8a of the DC power supplies 7 and 8 are connected to both ends 44a and 44b, respectively, of the series circuit 44, and both ends of the series circuit 44 are grounded through the semiconductor switches 9 and 10, respectively. Further, a connection 44c between the unit circuits is connected to an output terminal 45a of the DC power supply 45, and the connection 44c between the unit circuits is grounded through the semiconductor switch 42.

Figure 16:
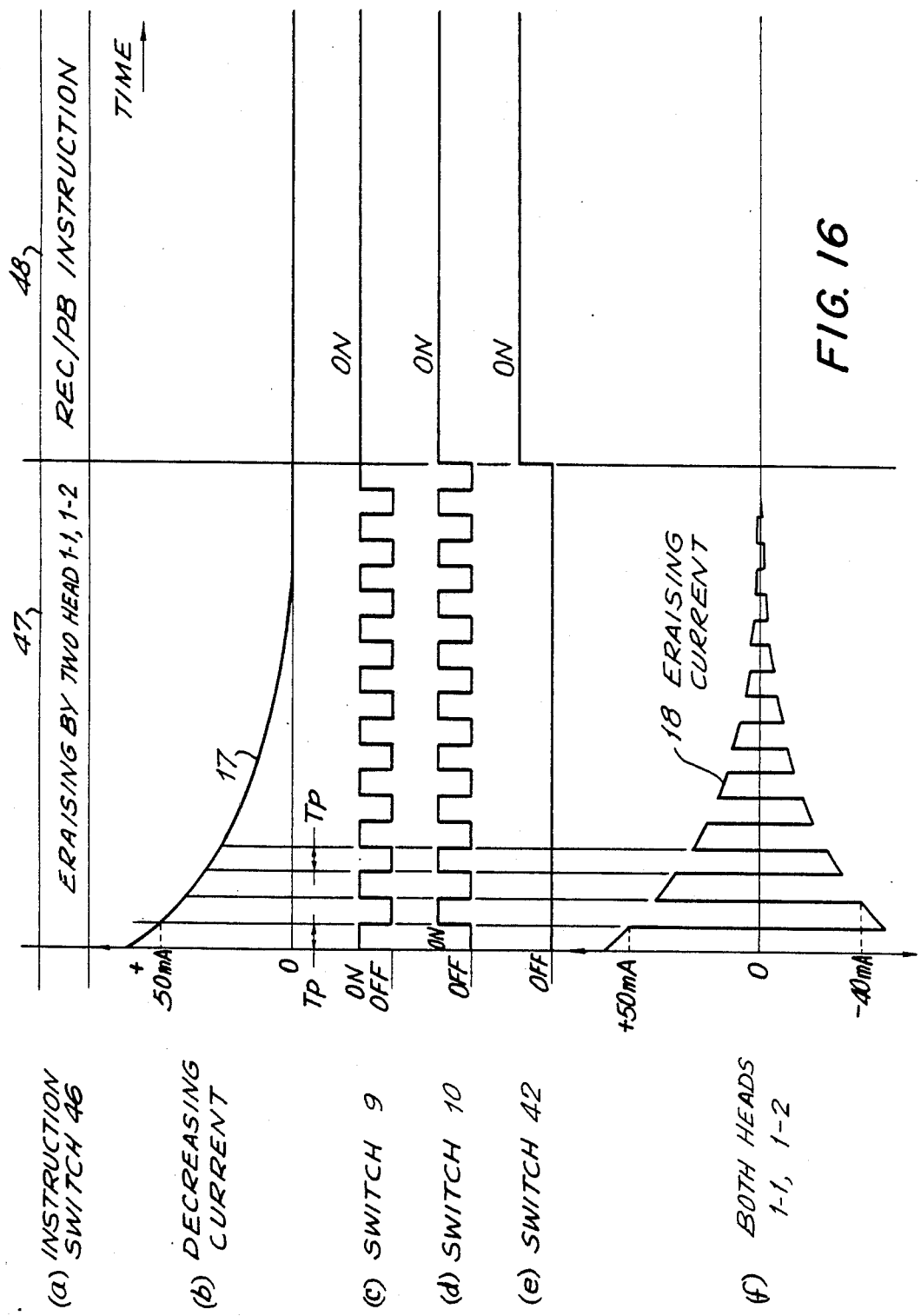
FIGS. 16(a) through (f), 17(a) through (f), and 18(a) through (f) are charts showing the operation of the apparatus shown in FIG. 15.
Figure 17:
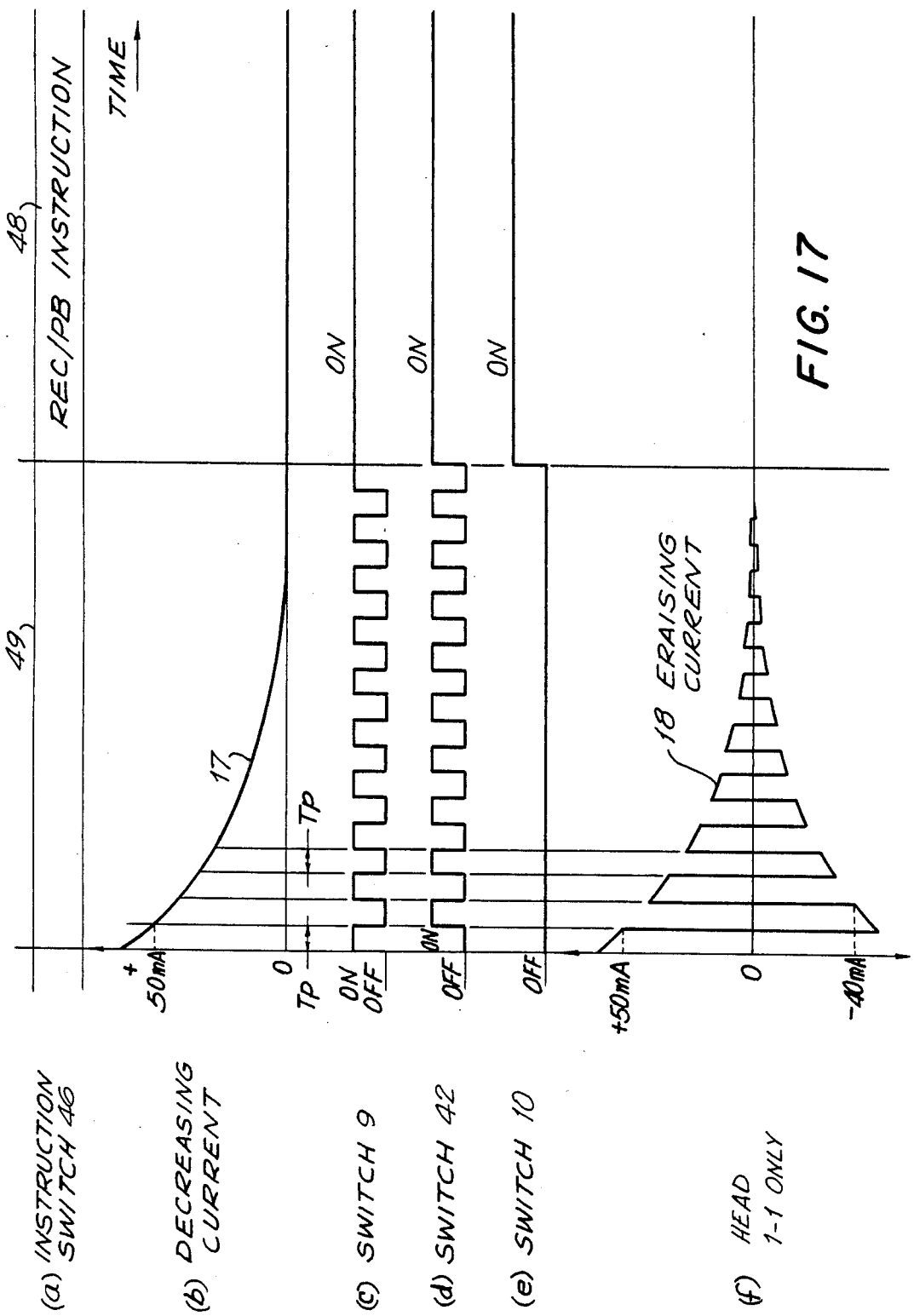
Figure 18:
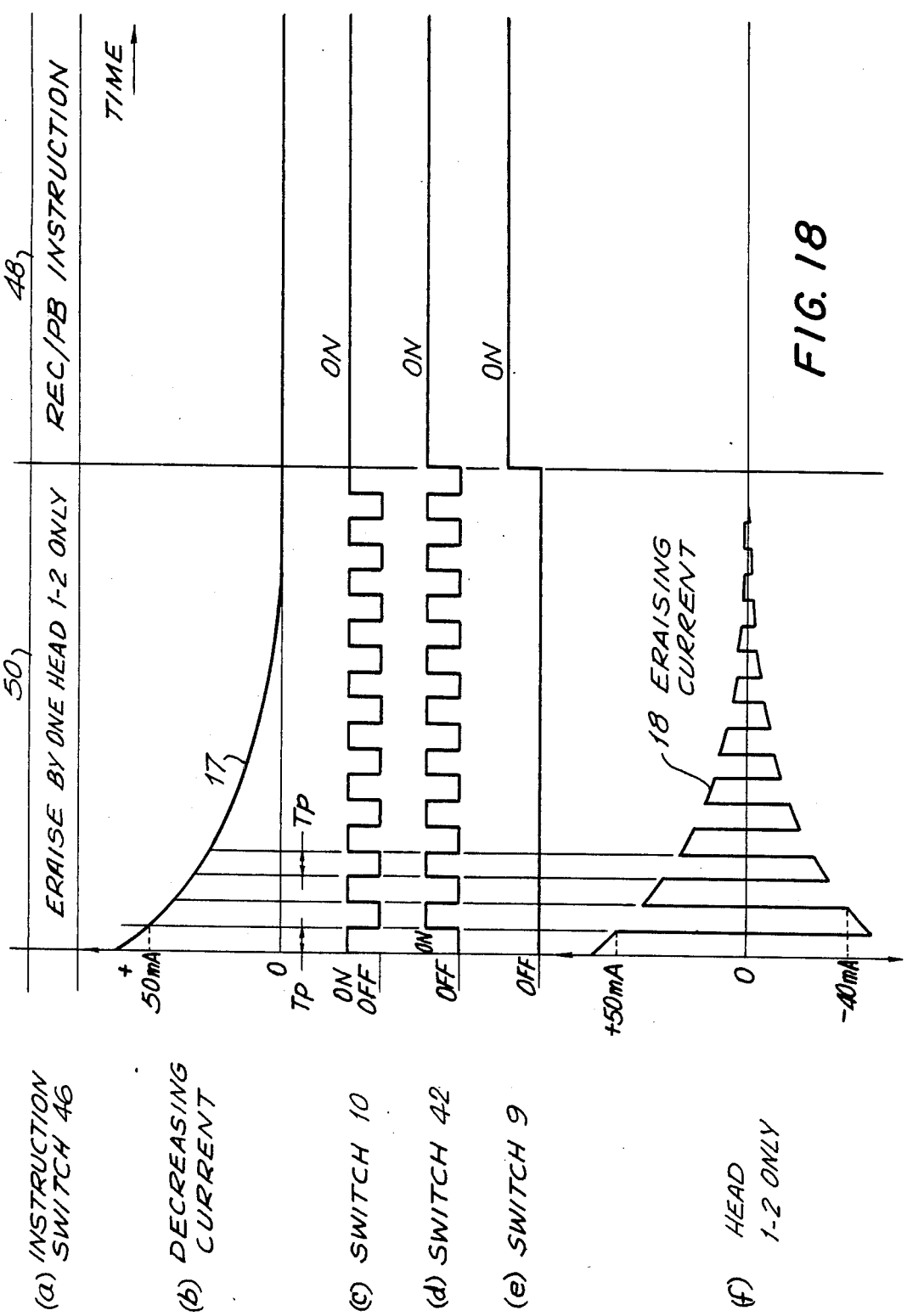

The operation of the demagnetizing apparatus shown in FIG. 15 will be described with reference to FIGS. 16, 17, and 18.

First, the operation will be described for a case in which the magnetic heads 1-1 and 1-2 are both used to erase two tracks simultaneously, with reference to FIGS. 16(a) through 16(f). when a 2-track erasing instruction 47 for the magnetic heads 1-1 and 1-2 is given by operating the instruction switch 46 as shown in FIG. 16(a), gradually decreasing currents 17 which decrease from a predetermined value to zero as shown in FIG. 16(b) are outputted only from the DC power supplies 7 and 8 connected to both ends of the series circuit 44 under the control of the current control circuit 12, and the output current of the DC power supply 45 connected to the connection 44c between the unit circuits is set to zero. In this case, the DC power supplies 7, 8, and 45 are controlled to output the same gradually decreasing current by the current control signal 12a, but only the current shut-off signal 12c for the DC power supply 45 is made active. At the same time, as shown in FIGS. 16(c) and 16(d), the two semiconductor switches 9 and 10 are alternately turned ON and OFF at every period of Tp under the control of the switching control circuit 11, where Tp≧Ts, and Ts is a scanning period for one turn of the track. The semiconductor switch 42 connected to the connection 44c between the unit circuits is set OFF under the control of the switching control circuit 11, as shown in FIG. 16(e). This causes the erasing current 18 having the same waveform as shown in FIG. 8 through the coils 2-1 and 2-2 of the two magnetic heads, as shown in FIG. 16(f), and two tracks are erased simultaneously. The erasing currents may decay to zero within 10 to 100 changes in polarity. After erasing, when a recording or reproducing instruction 48 is given by operating the instruction switch 46 as shown in FIG. 16(a), all the semiconductor switches 9, 10, and 42 are turned ON as shown in FIGS. 16(c), 16(d), and 16(e) under the control of the switching control circuit 11, with the output currents of the DC power supplies 7, 8, and 45 already decayed to zero. This shuts off the erasing currents, and the system is ready for recording or reproducing with the magnetic heads 1-1 and 1-2.

Next, the operation of the apparatus will be described for a case in which only the magnetic head 1-1, for example, is used to erase only one of the tracks, with reference to FIGS. 17(a) through 17(f). when a single-track erasing instruction 49 for the magnetic head 1-1 is given by operating the instruction switch 46 as shown in FIG. 17(a), the gradually decreasing currents 17 which decrease from a predetermined value to zero as shown in FIG. 17(b) are outputted only from the DC power supplies 7 and 45 under the control of the current control circuit 12, and the output current of the DC power supply 8 connected to the other end 44b of the series circuit 44 is set to zero. In this case, the DC power supplies 7, 8, and 45 are controlled to output the same gradually decreasing currents by the current control signal 12a, but only the current shut-off signal 12d for the DC power supply 8 is made active. At the same time, as shown in FIGS. 17(c) and 17(d), the two semiconductor switches 9 and 42 connected to one end 44a of the series circuit 44 and the connection 44c between the unit circuits are alternately turned ON and OFF at every period of Tp under the control of the switching control circuit 11, where Tp≧Ts, and Ts is a scanning period for one turn of the track. The semiconductor switch 10 connected to the other end 44b of the series circuit 44 is set OFF under the control of the switching control circuit 11, as shown in FIG. 17(e). This causes the erasing current 18 having the same waveform as shown in FIG. 8 through only the coil 2-1 of the magnetic head 1-1, as shown in FIG. 17(f), and only one track is erased. The erasing current may decay to zero within 10 to 100 changes in polarity. After erasing, when a recording or reproducing instruction 48 is given by operating the instruction switch 46 as shown in FIG. 17(a), all the semiconductor switches 9, 10, and 42 are turned ON as shown in FIGS. 17(c), 17(d), and 17(e) under the control of the switching control circuit 11, with the output currents of the DC power supplies 7, 8, and 45 already set to zero. This shuts off the erasing current, and the system is ready for recording or reproducing with the magnetic heads 1-1 and 1-2.

Then, the operation of the apparatus will be described for a case in which only the other magnetic head 1-2 is used to erase only the other track, with reference to FIGS. 18(a) through 18(f). when a single-track erasing instruction 50 for the magnetic head 1-2 is given by operating the instruction switch 46 as shown in FIG. 18(a), the gradually decreasing currents 17 which decrease from a predetermined value to zero as shown in FIG. 18(b) are outputted only from the DC power supply 8 connected to the other end 44b of the series circuit 44 and the DC power supply 45 connected to the connection 44c between the unit circuits under the control of the current control circuit 12, and the output current of the DC power supply 7 connected to one end 44a of the series circuit 44 is set to zero. In this case, the DC power supplies 7, 8, and 45 are controlled to output the same gradually decreasing currents by the current control signal 12a, but only the current shut-off signal 12b for the DC power supply 7 is made active. At the same time, as shown in FIGS. 18(c) and 18(d), the two semiconductor switches 10 and 42 connected to the other end 44b of the series circuit 44 and the connection 44c between the unit circuits are alternately turned ON and OFF at every period of Tp under the control of the switching control circuit 11, where Tp≧Ts, and Ts is a scanning period for one turn of the track. The semiconductor switch 9 connected to one end 44a of the series circuit 44 is set OFF under the control of the switching control circuit 11, as shown in FIG. 18(e). This causes the erasing current 18 having the same waveform as shown in FIG. 8 through only the coil 2-2 of the magnetic head 1-2, as shown in FIG. 16(f), and only the other track is erased. The erasing current may decay to zero within 10 to 100 changes in polarity. After erasing, when a recording or reproducing instruction 48 is given by operating the instruction switch 46 as shown in FIG. 18(a), all the semiconductor switches 9, 10, and 42 are turned ON as shown in FIGS. 18(c), 18(d), and 18(e) under the control of the switching control circuit 11, with the output currents of the DC power supplies 7, 8, and 45 already set to zero. This shuts off the erasing current, and the apparatus is ready for recording or reproducing with the magnetic heads 1-1 and 1-2.

The demagnetizing apparatus shown in FIG. 15 is designed so that erasing can be independently made with either of the magnetic heads 1-1 and 1-2. However, in some cases, it will be sufficient if only one of the magnetic heads, the magnetic head 1-1, for example, can make erasing. For such a purpose, the current shut-off signal 12b, applied by the current control circuit 12 to the DC power supply 7, can be eliminated.

Fifth embodiment

An embodiment of the fourth demagnetizing apparatus according to the present invention will now be described with reference to FIGS. 19 and 20.

Figure 19:
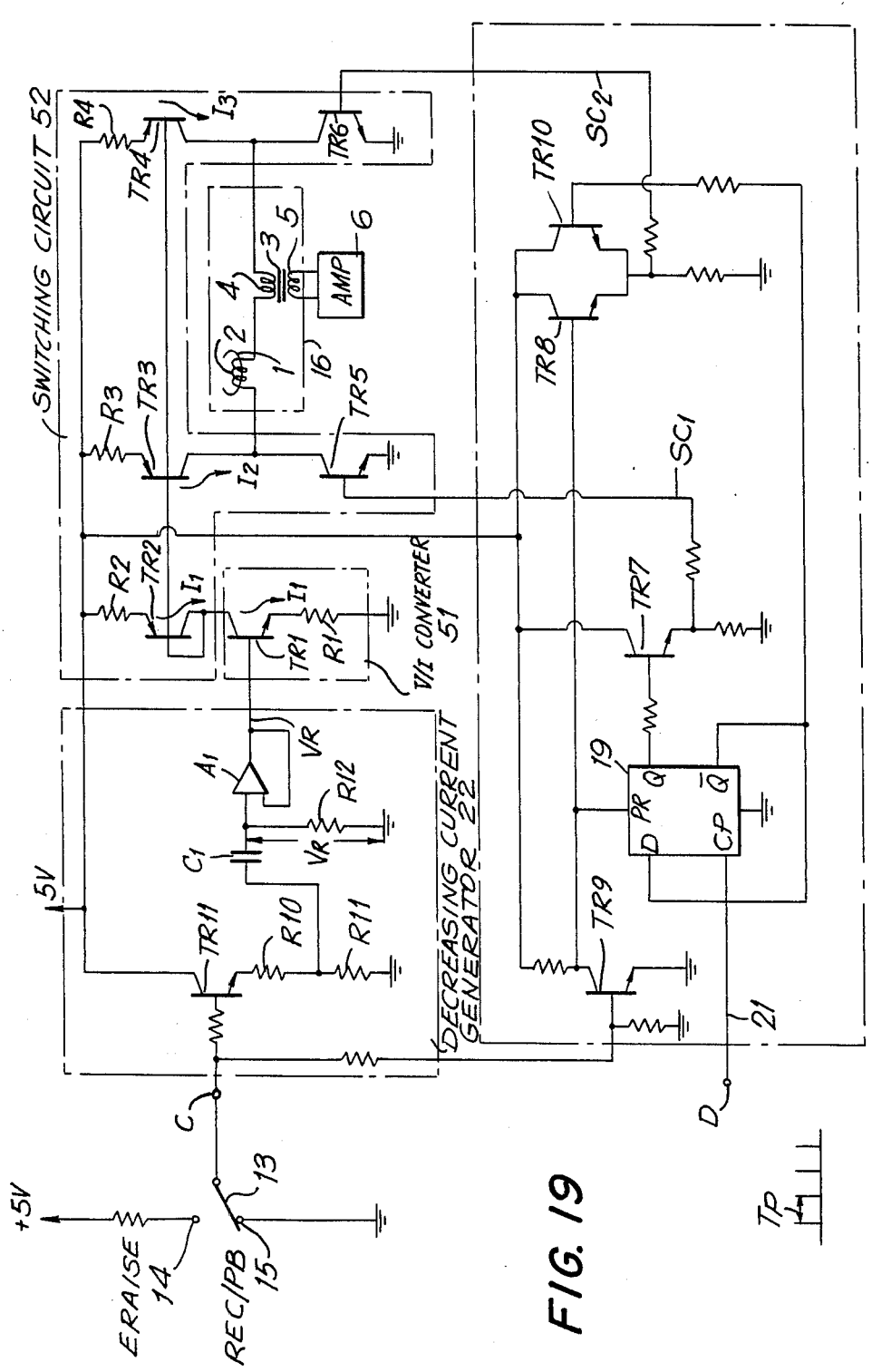
FIG. 19 is a circuit diagram of an embodiment of the fourth demagnetizing apparatus according to the present invention.
Figure 20:
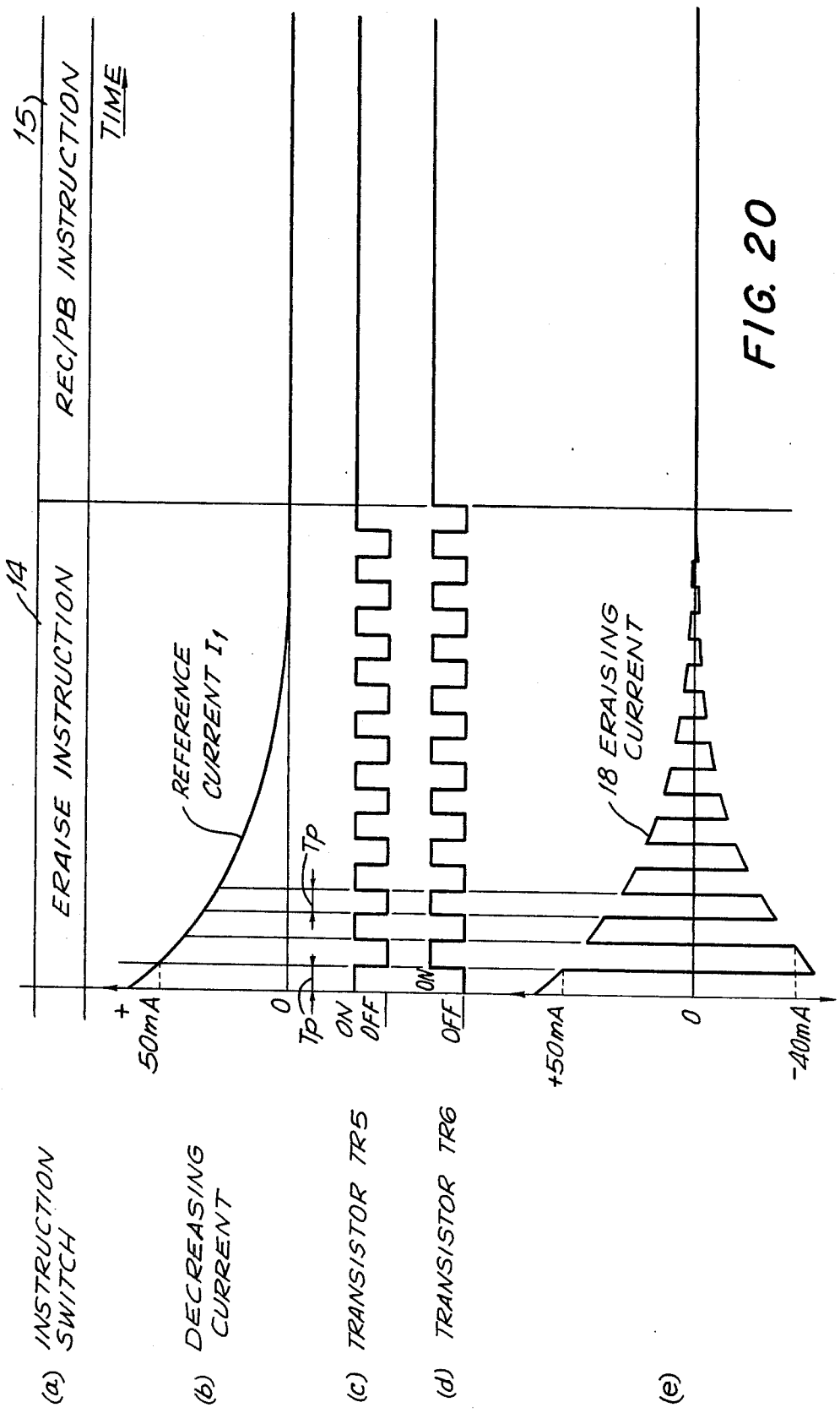
FIG. 20, (a) through (e), is a chart showing the operation of the apparatus shown in FIG. 19.

Referring to FIG. 19, the demagnetizing apparatus according to the present invention consists of a decreasing voltage generator circuit 22, a voltage/current converter circuit 51, a switching circuit 52 using a constant-current DC power supply, a series circuit 16, and a switching control circuit 11. Functions and operations of these circuits will be described.

The decreasing voltage generator circuit 22 has a time constant circuit consisting of a transistor TR11, voltage dividing resistors R10 and R11 for voltage determination, a capacitor C1, and a resistor R12, and a buffer amplifier A1. A terminal C is applied with a HIGH-level erasing instruction 14 during erasing operation of the apparatus, or with a LOW-level recording or reproducing instruction 15 during recording or reproducing operation of the system. In the erasing operation, the HIGH-level erasing instruction causes the transistor TR11 to be conductive, and a gradually decreasing DC voltage VR is developed across the resistor R12 and outputted through the buffer amplifier A1. The gradually decreasing DC voltage VR decays exponentially with a time constant determined by the capacitor C1 and the resistor R12. In the recording or reproducing operation, on the other hand, the LOW-level recording or reproducing instruction 15 causes the transistor TR11 to be non-conductive, and the output voltage of the decreasing voltage generator circuit 22 is zero.

The voltage/current converter circuit 51 consists of a transistor TR1 and a resistor R1, and converts the gradually decreasing DC voltage VR supplied to the base of the transistor TR1 to current to obtain a gradually decreasing reference voltage I1 (see FIG. 20(b)).

The switching circuit 52 consists of a reference transistor TR2, transistors TR3 and TR4, switching transistors TR5 and TR6, and feedback resistors R2, R3, and R4. The feedback resistors R2, R3, and R4 have the same resistance values. The reference transistor TR2 is connected in a diode configuration. The bases of the transistors TR2 and TR3 are connected to each other to form a first current mirror circuit, and the value of a reference current I1 flowing through the reference transistor TR2 is equal to that of collector current I2 flowing through the transistor TR3. The bases of the transistors TR2 and TR4 are connected to each other to form a second current mirror circuit, and the value of the reference current I1 is equal to that of a collector current I3 flowing through the transistor TR4. The switching transistors TR5 and TR6 are alternately turned ON and OFF at every period of Tp under the control of the switching control circuit 11 (see FIGS. 20(c) and 20(d)). The polarity switching period Tp is the same as or longer than a track scanning period Ts.

The series circuit 16 consists of a coil 2 of the recording or reproducing magnetic head 1 and a primary coil 4 of a transformer 3, connected in series, and connected to the collectors of the transistors TR3 and TR4. A secondary coil 5 of the transformer 3 is connected to a recording or reproducing amplifier 6.

The switching control circuit 11 has transistors TR7, TR8, TR9, and TR10, and a flip-flop 19. The base of the transistor TR7 is connected to a terminal Q of the flip-flop 19, and the base of of the transistor TR10 is connected to a terminal $\overline{Q}$ of the flip-flop 19. The base of the transistor TR8 is connected to the collector of the transistor TR9, and the base of the transistor TR9 is connected to the input terminal C of the decreasing voltage generator circuit 22. The emitter of the transistor TR7 is connected to the base of the switching transistor TR5 of the switching circuit 52, and the emitters of the transistors TR8 and TR10 are connected to the base of the switching transistor TR6 of the switching circuit 52. In this case, an input terminal D connected to a terminal CP of the flip-flop 19 is inputted with a pulse 21 from a pulse generator at every polarity switching period Tp. When Tp=Ts, a PG pulse or a VD pulse is used as the pulse 21. When Tp>Ts, a pulse 24a from a frequency generator 24 is frequency-divided to obtain the pulse 21, as shown in FIG. 4. In the erasing operation, the transistor TR11 is made conductive by the HIGH-level erasing instruction 14, a terminal PR of the flip-flop 19 is set to a LOW level to preset the flip-flop 19, the base of the transistor TR8 is set to a LOW level to make the transistor TR8 non-conductive. At this moment, the pulse 21 is inputted at every polarity switching period Tp, the terminal Q and $\overline{Q}$ are alternately set to HIGH and LOW levels and, in turn, the transistors TR7 and TR10 are alternately turned ON and OFF. As a result, the transistors TR5 and TR6 connected to the transistors TR7 and TR10 are turned ON and OFF alternately. In the recording or reproducing operation, on the other hand, the transistor TR9 is made non-conductive by the LOW recording or reproducing instruction, the terminal PR of the flip-flop 19 is set to a HIGH level, the flip-flop 19 is not preset, and the transistor TR8 is made conductive. Thus, since the transistor TR7 is conductive while the terminal Q is at HIGH level, the switching transistor TR5 is turned ON, and since the transistor TR8 is conductive, the switching transistor TR6 is also turned ON.

The operation of the entire apparatus of this embodiment will now be described.

In the erasing operation of the apparatus, the erasing instruction 14 is inputted to the terminal C, and the gradually decreasing DC reference current I1 is generated in the voltage/current converter circuit 51. The reference current I1 (see FIG. 20(b)) also flows through the reference transistor TR2 of the switching circuit 52. Then, the switching transistors TR5 and TR6 are alternately turned ON and OFF at every polarity switching period Tp under the control of the switching control circuit 11 (see FIGS. 20(c) and 20(d)). With a current mirror effect, the collector current I2 and I3 having the same values as the reference current I1 flow alternately. As a result, the erasing current 18 as shown in FIG. 20(e) flows through the coil 2 of the magnetic head 1, thereby accomplishing erasing.

In the recording or reproducing operation, the recording or reproducing instruction 15 is inputted to the terminal C, and the current I1, I2, and I3 are not developed. The switching transistors TR5 and TR6 are both turned ON by switching control instruction SC1 and SC2 (see FIGS. 20(c) and 20(d)). The system is now ready for recording or reproducing on receiving recording or reproducing signals through the recording or reproducing amplifier 6 and the transformer 3.

With this embodiment, since the magnetic head is switched for recording/reproducing or erasing use by the ON/OFF operation of the semiconductor switches and controlling the DC power supplies using the current mirror effect, the circuit configuration can be made compact and simplified, with enhanced reliability. Thus, the constant-current power supplies can be extremely simplified and easily controlled.

Study on the Erasing Current Values and Decay Time

Figure 21:
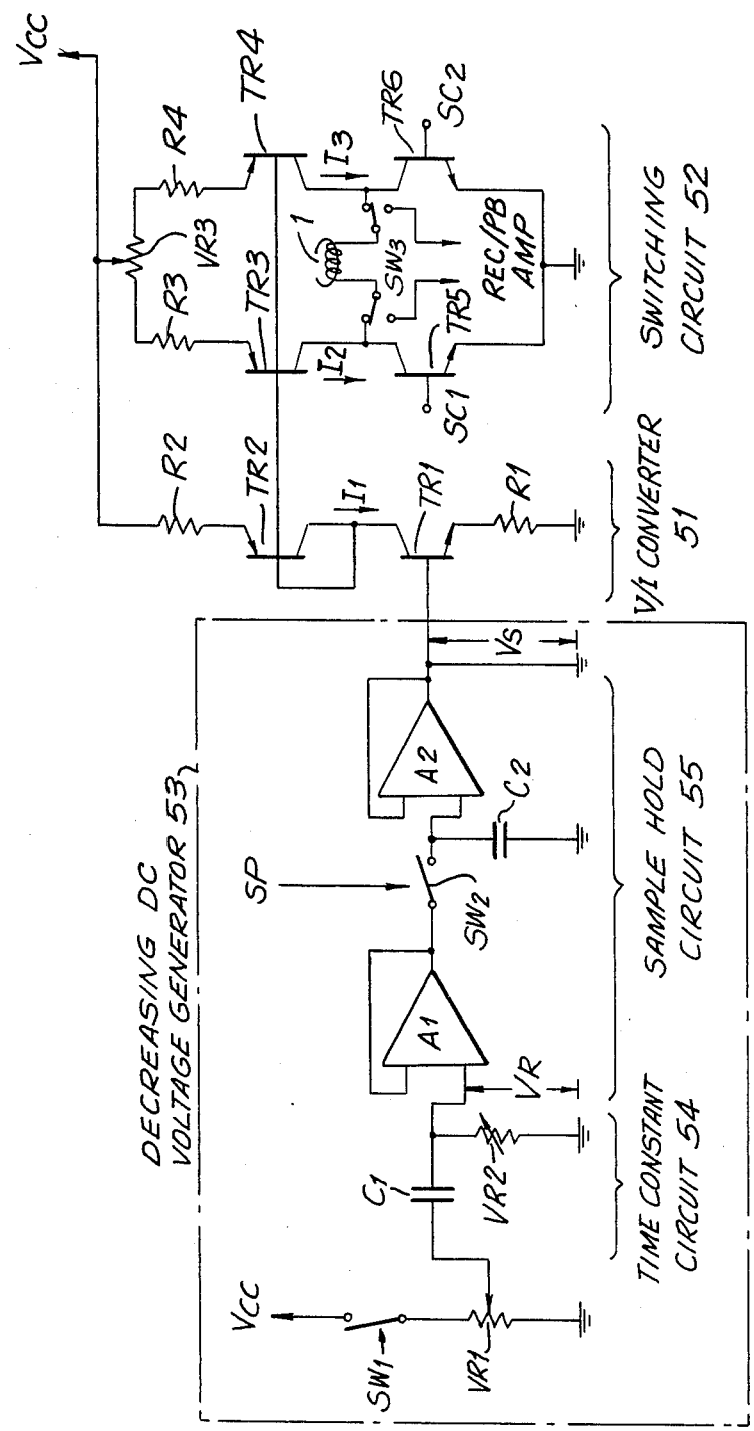
FIG. 21 is a circuit diagram showing a demagnetizing apparatus used in experiments for determining preferable erasing conditions.

Experiments were carried out for determining optimum erasing conditions with an apparatus shown in FIG. 21. With the experiments, it was found that the erasing current should preferably be set to an initial saturation current value equal to to twice an optimum recording current value sufficient for magnetically saturating a track on the magnetic recording medium over the almost entire range of recording frequencies, and the decay time of the erasing current decaying from the maximum amplitude to a 5% value of the maximum amplitude should be set to 30 to 60 times the track scanning period.

The experiments will now be described in detail. FIG. 21 is a circuit diagram of the apparatus used in the experiments. Referring to FIG. 21, a decreasing DC voltage generator circuit 53 consists of an erasing switch SW1, a variable resistor VR1, a time constant circuit 54, and a sample hold circuit 55. The time constant circuit 54 consists further of a capacitor C1 and a variable resistor VR2, and the sample hold circuit 55 consists further of input/output buffer amplifiers A1 and A2, a sampling switch SW2, and a capacitor C2.

Figure 22:
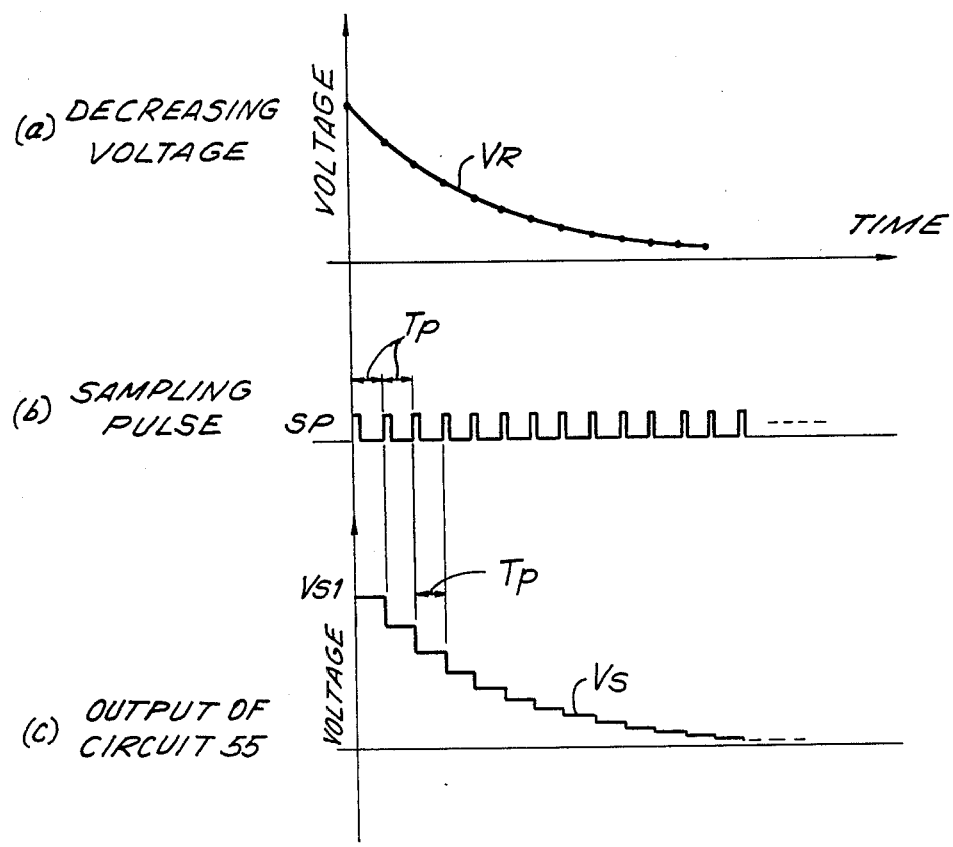
FIGS. 22(a) through 22(g) are charts showing waveforms at different points of the circuit shown in FIG. 21.

When the erasing switch SW1 of the decreasing DC voltage generator circuit 53 is turned ON, a gradually decreasing DC voltage VR as shown in FIG. 22(a) is developed across terminals of the variable resistor VR2. The voltage VR decays exponentially with a CR time constant determined by the capacitor C1 and the variable resistor VR2.

The circuit shown in FIG. 21 is designed for use in a recording system shown in FIG. 6, and set as Tp=Ts=1/60 sec in view of the nominal scanning period Ts for one turn of the track, Ts=1/60 sec. The erasing switch SW1, which is normally of an electronic type, is turned ON by a control signal from a timing pulse generator circuit. When Tp=Ts, the timing pulse generator circuit can be operated synchronizing with the output pulse of a PG detector for detecting the rotation phase of the magnetic disk. When Tp>Ts, the timing pulse generator circuit can be operated in response to the oscillation output of a suitable oscillator.

The sample hold circuit 55 samples and holds the gradually decreasing DC voltage VR using a sampling pulse SP with a period of Tp shown in FIG. 22(b). The sample hold circuit 55 can be any of conventionally used ones, which samples and holds the gradually decreasing DC voltage VR at every period Tp (1/60 sec in this example) with the sampling pulse SP given by the timing pulse generator circuit. Thus, the sample hold circuit 55 outputs a voltage Vs having a stepwise decreasing waveform as shown in FIG. 22(c).

A V/I converter circuit 51 consists of a transistor TR1 and a resistor R1 and converts the voltage Vs supplied to the base of the transistor TR1 to a current I1.

Thus, the gradually decreasing current I1 having a stepwise decreasing waveform, as shown in FIG. 22(d), is obtained at the output of the V/I converter circuit 51, that is, the collector of the transistor TR1.

A switching circuit 52 consists of five transistors TR2 through TR6, a variable resistor VR3, and three resistors R2 through R4. Resistance values of the resistors R2 through R4 and the variable resistor VR3 are set to satisfy the relation $R2 \approx R3 + VR3/2 \approx R4 + VR3/2$. The transistor TR2 is connected in a diode configuration and forms a current mirror circuit together with the transistors TR3 and TR4. Therefore, the collector currents I2 and I3 of the transistors TR3 and TR4 have values almost equal to the collector current of the transistor TR2, that is, almost equal to the gradually decreasing current I1. The transistors TR3 and TR4 are switches which are turned ON and OFF by the control signals SC1 and SC2 supplied to the respective bases of the transistors. In the erasing mode of the apparatus, the control signals SC1 and SC2 are alternately set to a HIGH level with a period of Tp synchronizing with the sampling pulse SP to alternately turn ON and OFF the transistors TR3 and TR4 with a period Tp. The waveform of the control signal SC1 is shown in FIG. 20(g).

The magnetic head 1 is an amorphous head, connected between the collectors of the transistors TR3 and TR4. Therefore, the gradually decreasing current I2 via the transistor TR3 and the gradually decreasing current I3 via the transistor TR4 flow through the magnetic head 1 with a period of Tp. Thus, the gradually decreasing current I1 is reversed in polarity with the period Tp by the switching circuit 52, and supplied as an erasing current 39 having the same waveform as shown in FIG. 10 to the magnetic head 1. The polarity reverse timing and the output current waveform of the switching circuit 52 are shown in FIG. 22(e) and 22(f).

In the REC/PB operation of the apparatus, a head select switch SW3 is turned to an AMP side to set the apparatus for normal recording or reproducing through the magnetic head 1.

Thus obtained erasing current has a gradually decreasing waveform as shown in FIG. 10, with positive and negative pulse trains having a period of Tp, of which the positive and negative envelope curves are symmetrical with respect to the 0-mA axis. This waveform should ideally be able to converge the hysteresis loops ultimately to the magnetic neutral point, and is preferable for erasing use. However, due to inconsistencies in circuit constants of transistors used, if, there occurs an unbalance in current amplitude to deform the waveform of the gradually decreasing current pulse train, such that the value of the first negative pulse current, that is the reverse of the first positive pulse current, is greater than that of the first positive pulse current, that is the initial saturation current, then the second positive pulse current is extremely smaller than the first negative pulse current, and the second negative pulse current is greater than the second positive pulse current, the erasing effect will be considerably reduced. This fact was experimentally confirmed.

The variable resistor VR3 used in the apparatus shown in FIG. 21 is for adjusting the balance of positive and negative current values.

The erasing current should be set to an initial saturation current value equal to to twice the optimum recording current sufficient for magnetically saturating a track on the magnetic recording medium over the almost entire range of recording frequencies, and the decay time T of the erasing current decay from the maximum amplitude to a 5% value of the maximum amplitude should be set to 30 to 60 times the track scanning period (0.5 to 1.0 sec in this example).

The initial saturation current value of the erasing current 39 and the decay time T can be controlled by adjusting the variable resistors VR1 and VR2 to change the initial value of the gradually decreasing DC voltage VR and the time constant CR of the time constant circuit of the apparatus shown in FIG. 21.

Figure 23:
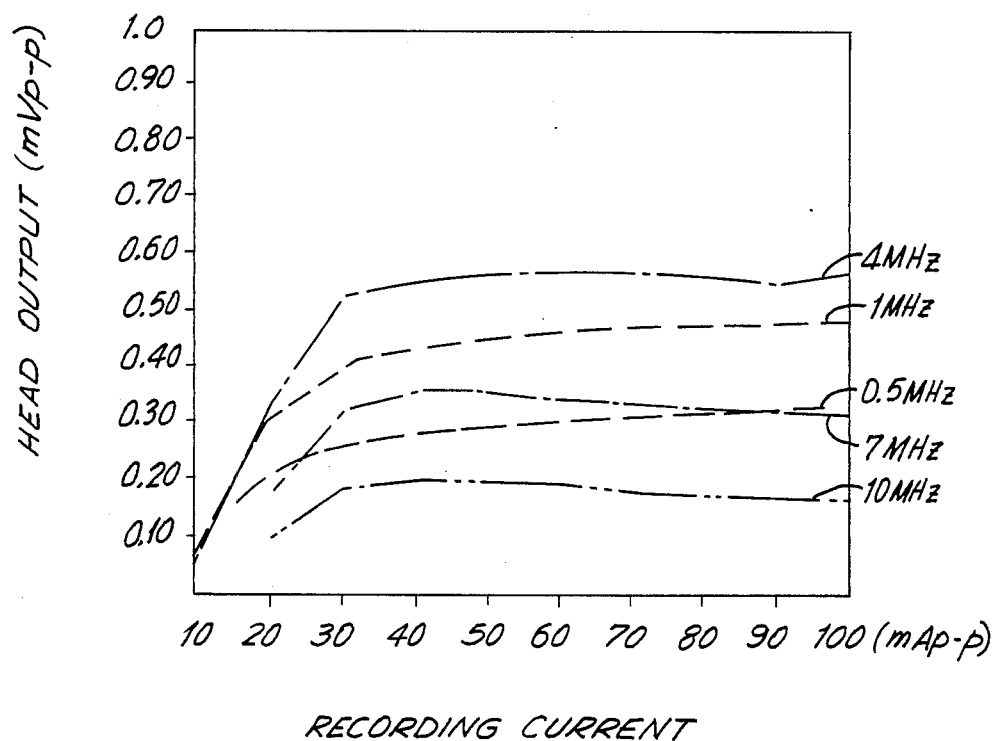
FIG. 23 is a graphic showing recording characteristics of an amorphous head.

The optimum recording current value was determined as follows. FIG. 23 is a graphic showing the recording characteristics of the amorphous magnetic head. From FIG. 23, it can be seen that the recording current sufficient to saturate a track on the magnetic disk over the almost entire range of recording frequencies is 40 mA(p-p) or more. Thus, in this case, the saturation recording current is 40mA(p-p).

For the compact floppy disk for recording video signals, as specified in the standards of magnetic disk for use in electronic still cameras, because the recording signal spectrum has a peak in the vicinity of 7MHz, the recording current value can practically be selected so that the reproduction output is the maximum when recording with a frequency of 7MHz.

To effectively converge the hysteresis loops to zero, the erasing current should not be decreased rapidly, and to shorten the erasing time, the initial value of the erasing current 39 should be smaller. Then, the erasing current was determined to be equal to to twice the optimum recording current, with some allowance for saturating magnetization.

Figure 26:
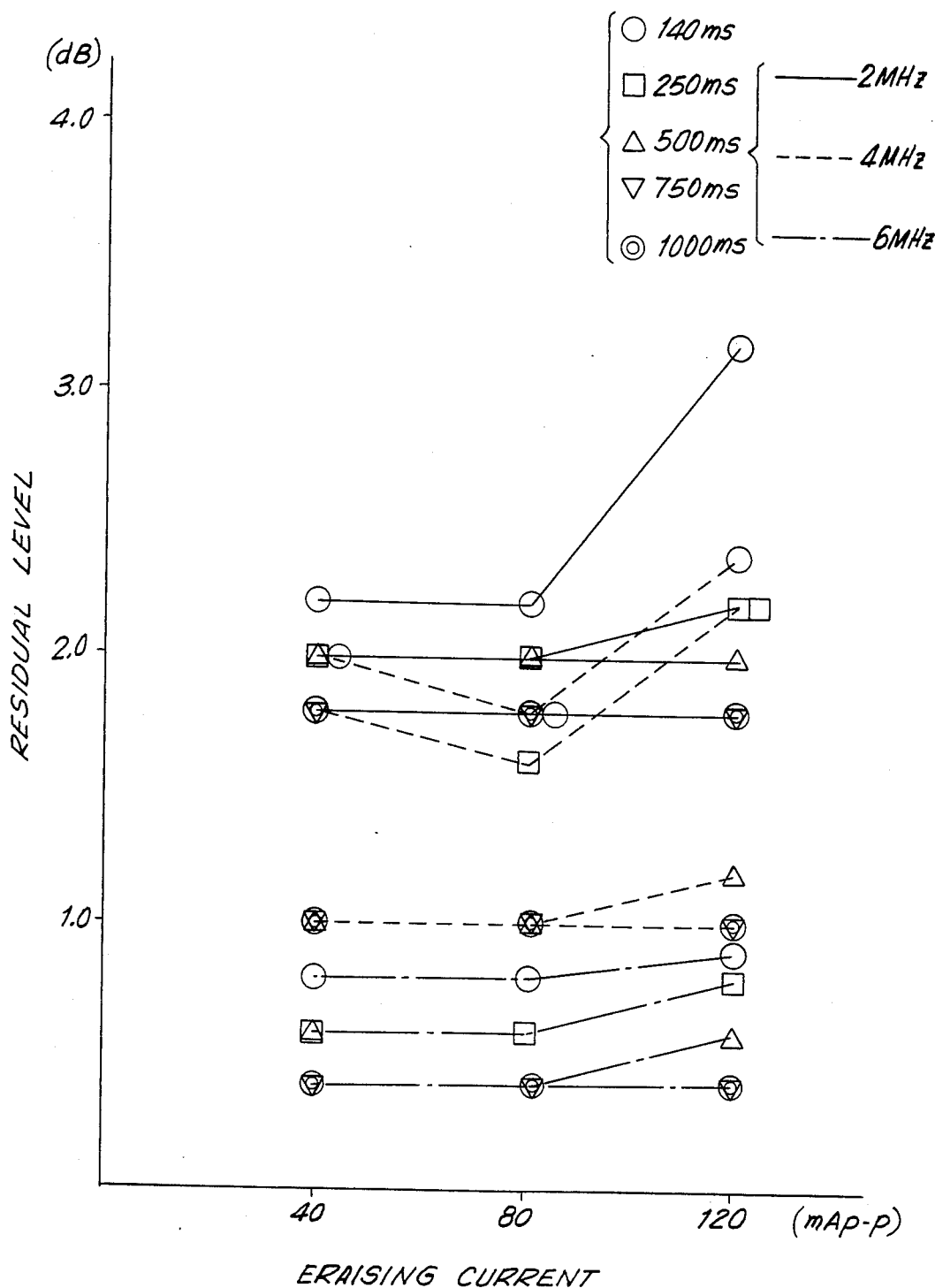
FIG. 26 is a graphic showing the relationship between initial saturation current values and residual level characteristics in the circuit shown in FIG. 21.

FIG. 26 is a graphic showing residual levels of previously recorded 100% color bar signals, erased with erasing current amplitudes (initial values) of 40mA(p-p), 80mA(p-p), and 120mA(p-p), five decay time values from 140 msec to 1,000 msec, for frequencies of 2MHz (solid lines), 4MHz (dotted lines), and 6MHz (dot-bar lines). Referring to FIG. 26, it can be seen that especially favorable erasing effects can be obtained with the initial saturation current values of the erasing current 39 within the range from 40 mA(p-p) to 80 mA(p-p), from low to high frequency ranges. With greater erasing current amplitude and shorter decay time, the residual level becomes greater. This is considered as due to insufficient convergence of hysteresis loops caused by rapid decay of the erasing current.

Figure 25:
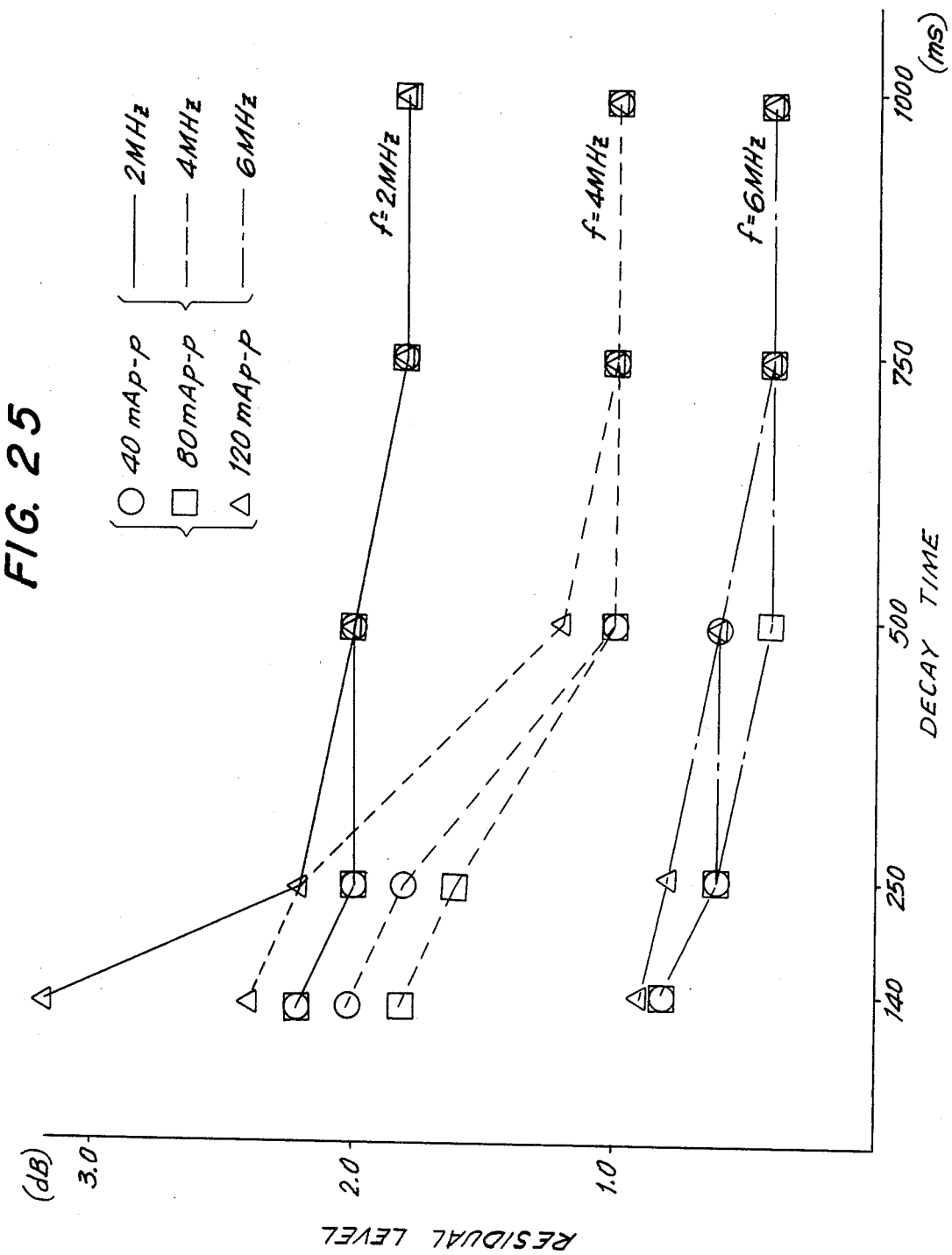
FIG. 25 is a graphic showing the relationship between the decay time of erasing current and residual level characteristics in the circuit shown in FIG. 21.

FIG. 25 is a graphic showing the relationship between residual levels and decay time T, with initial saturation current values of the erasing current 39 of 40mA(p-p), 80mA(p-p), and 120mA(p-p), for frequency components of 2MHz, 4MHz, and 6MHz. It can be seen from the Figure that satisfactory erasing can be accomplished for all the frequency ranges with decay time T over 400 msec.

Figure 27:
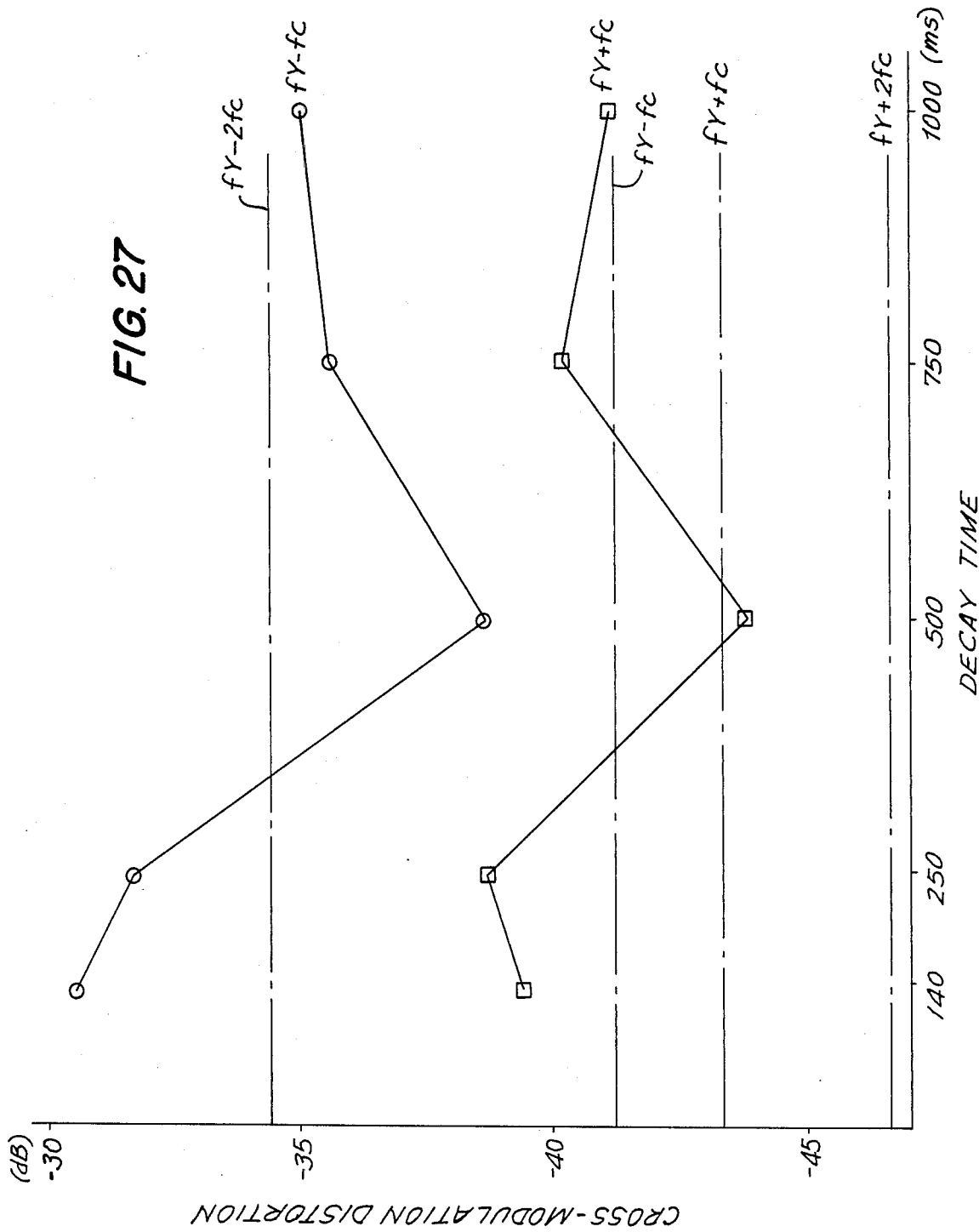
FIG. 27 is a graphic showing the relationship between the decay time of erasing current and cross-modulation distortion in the circuit shown in FIG. 21.

The residual level is generally used for evaluating the erasing performance. However, from the practical point of view, it is also important to check for any adverse effects of the residual magnetism on the quality of images which are rewritten after erasing. FIG. 27 is a graphic showing cross-modulation distortion relating to moire distortion which occurs in reproduced images of signals rewritten after erasing, measured with a fixed initial erasing current amplitude of 80mA(p-p) and varied decay time from 140 msec to 1,000 msec.

In FIG. 27, fr±fc indicates a secondary distortion component caused by cross-modulation between the carrier frequency component of the luminance signal and the carrier frequency component of the chroma signal. The fr+fc component is not important because its output decreases in high frequency ranges, which is specific to magnetic recording and reproducing systems. However, it was experimentally confirmed that the fr−fc component correlated with appearance of the moire distortion on the image.

For comparison, FIG. 27 also shows measured values of the cross-modulation distortion components fr±fc when, after bulk erasing, the same signal is rewritten and reproduced.

It can be seen from FIG. 27 that the value of erasing amplitude decay time that minimizes cross-modulation distortion is around 500 msec. Although distortion is rather high even with the erasing method according to the present invention, compared to that with the bulk erasing method, the fr−fc component can be erased to a level fairly close to the bulk erasing level if the decay time is selected near the value that minimizes cross-modulation.

Another cross-modulation distortion component is a fr±2fc component. However, this component is a factor which is almost determined by setting of the chroma current and does not affect the erasing performance. Therefore, it is not plotted in the Figure.

In view of the performance shown in FIGS. 25 and 27 and in consideration of the fact that the erasing time should preferably be shorter as practicable, the decay time T in this example should be 500 msec to 1,000 msec.

This example uses an amorphous head as the magnetic head 1. In the same experiment with a thin-film head using an optimum recording current determined according to the above described method (80 mA(p-p) for Sony's thin-film head), an erasing current with an initial saturation current value of equal to to twice the optimum recording current and a decay time T of 500 to 1,000 msec provided the same satisfactory result as the above example. This indicates that the most important condition that varies with type of head is the amplitude condition of current flowing through the head and, in turn, the magnitude of generated magnetic field, and a magnetic field sufficient to erase recorded signals can be generated with the thin-film head when the amplitude of the erasing current is set to a value equal to to twice the optimum recording current.

Figure 24:
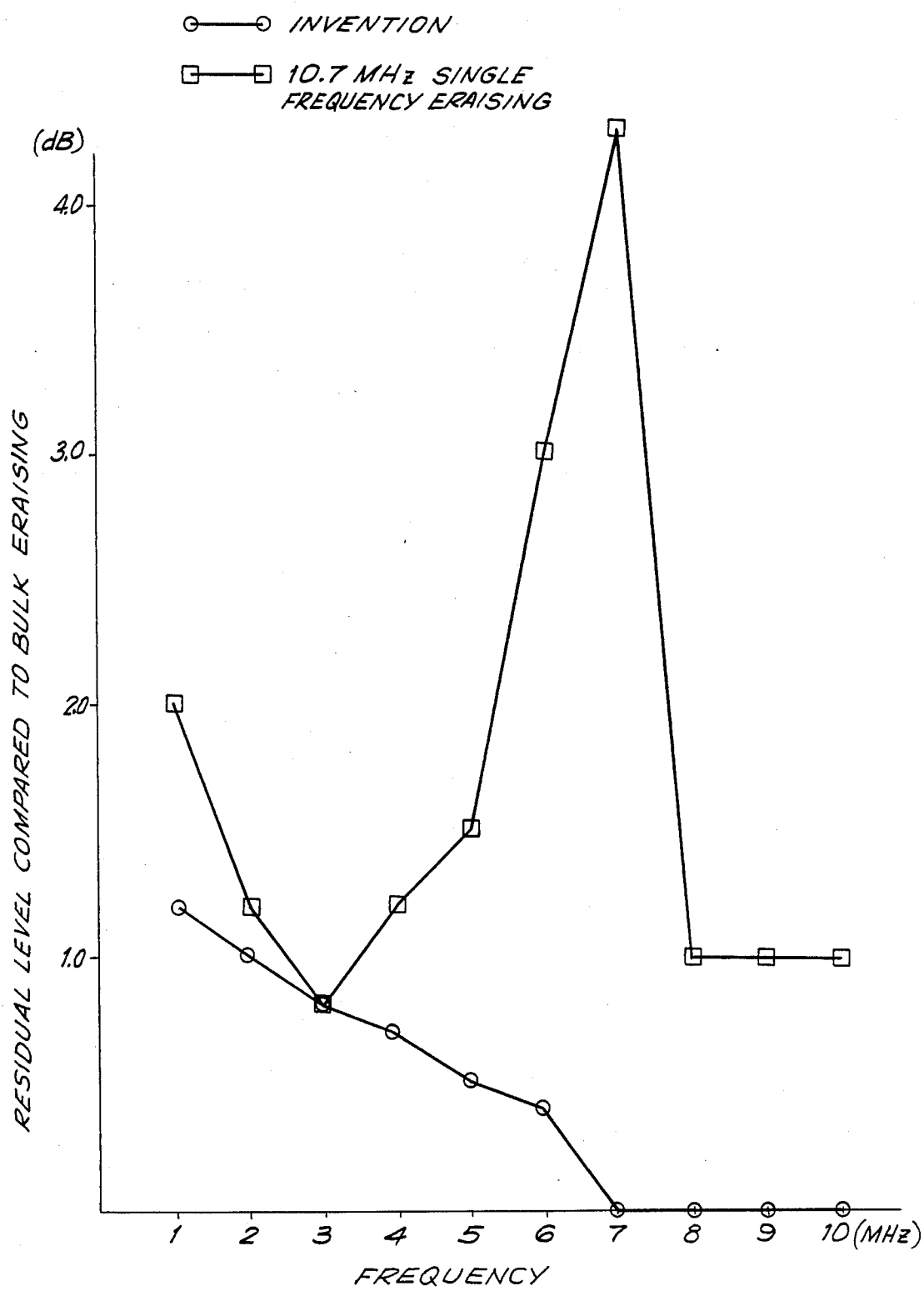
FIG. 24 is a graphic showing the results of erasing experiments with the erasing method according to the present invention and a single frequency erasing method, plotting spectrum data of residual levels with respect to that with the bulk erasing method.

FIG. 24 is a graphic showing residual level spectrum data of the erasing method according to the present invention and the single-frequency erasing method with respect to the bulk erasing method.

It can be seen from FIG. 24 that the residual components of 2MHz to 10MHz are erased with residual level less than +1 dB compared to those of the bulk erasing method.

Effects of the Invention

The demagnetizing apparatus according to the present invention can satisfactorily erase wide-range, high-frequency recorded signals for track by track, using a recording or reproducing magnetic head.

Further, a single magnetic head can be switched for erasing and recording or reproduction, without using a relay.

What is claimed is:

1. A demagnetizing apparatus comprising a plurality of recording or reproducing magnetic heads for separately scanning concentric tracks on a magnetic recording medium, a plurality of transformers having first coils connected to a recording or reproducing amplifier and second coils insulated regarding DC potentials from said first coils, a plurality of unit circuits, each consisting of each coil of said magnetic heads and each second coil of said transformers connected in series, a series circuit consisting of said plurality of unit circuits connected in series, a plurality of current-controllable, constant-current DC power supplies having the same polarity, with output terminals connected to both ends of said series circuit and any of connections between said unit circuits, a plurality of semiconductor switches connected to both ends of said series circuit and between a connection of said unit circuits and return paths of said DC power supplies, a switching control circuit for keeping ON all of said plurality of semiconductor switches during recording or reproduction operation of said apparatus, or in a first erasing mode, alternately switching ON and OFF said two semiconductor switches connected to both ends of said series circuit with a period of the same as or longer than that for scanning one turn of a track and keeping OFF the other semiconductor switch, or in a second erasing mode, alternately switching ON and OFF said semiconductor switch connected to the connection between said unit circuits connected with an output terminal of said DC power supply and another one of said semiconductor switches connected to another one of said DC power supplies with a period of the same as or longer than that for scanning one turn of a track and keeping OFF the other semiconductor switch, and a current control circuit for keeping current values of all said DC power supplies at zero during recording or reproduction operation of said apparatus, or varying current values of said two DC power supplies with output terminals connected to said two semiconductor switches to be ON/OFF controlled so as intensity of magnetic field of said magnetic head applied to a point on said track to be erased to decrease at every switching operation of said semiconductor switches and keeping current values of the other DC power supplies at zero during erasing operation of said apparatus.

2. A demagnetizing apparatus as claimed in claim 1, wherein initial value of an erasing current is set to an initial saturation current value equal to twice an optimum recording current sufficient for magnetically saturating a track on a magnetic recording medium over an almost entire range of recording frequencies, and decay time of said erasing current decaying from a maximum amplitude to a 5% value of said maximum amplitude is set to 30 to 60 times a track scanning period.

3. A demagnetizing apparatus as claimed in claim 2, wherein a magnetic field is generated in a gap of said magnetic head along a lengthwise direction of said track.

4. A demagnetizing apparatus as claimed in claim 2, wherein said magnetic head is an amorphous magnetic head.

* * * * *